United States Patent [19]

Tupper

[11] 4,216,916
[45] Aug. 12, 1980

[54] APPARATUS FOR SHREDDING TIRE CASINGS

[76] Inventor: Myron D. Tupper, Rte. 3, Box 37900, Sandy Heights, Oreg. 97055

[21] Appl. No.: 12,010

[22] Filed: Feb. 14, 1979

[51] Int. Cl.³ .................... B02C 18/16; B02C 25/00
[52] U.S. Cl. ................................. 241/36; 157/13; 241/55; 241/222; 241/243; 241/DIG. 31
[58] Field of Search ............ 241/221, 222, 36, 293, 241/294, 190, 243, 298, DIG. 31, 55, 56; 51/334, 401, 407, 88, DIG. 33; 144/288 A; 157/13; 82/101, 52, 53; 407/113, 105, 114; 408/188

[56] References Cited

U.S. PATENT DOCUMENTS

| | | | |
|---|---|---|---|
| 2,842,175 | 10/1955 | Thompson | 241/243 |
| 3,137,918 | 12/1960 | Breuning | 407/113 |
| 3,316,616 | 5/1967 | Milewski | 407/105 |
| 3,456,315 | 7/1969 | Stiel | 407/104 |
| 3,593,461 | 7/1971 | Gay | 51/88 |
| 3,708,129 | 1/1973 | Nowak | 241/222 X |
| 3,731,884 | 5/1973 | Tupper et al. | 241/222 |
| 3,830,120 | 8/1974 | Peterson | 157/13 X |
| 3,928,949 | 12/1975 | Wagner | 51/401 |
| 4,125,228 | 11/1978 | Brewer | 241/243 |
| 4,147,196 | 4/1979 | Jarry | 157/13 |

*Primary Examiner*—Howard N. Goldberg
*Attorney, Agent, or Firm*—Eugene D. Farley

[57] ABSTRACT

A tire is placed upon an infeed support which initiates movement of a spindle to extend longitudinally through the tire, then expand radially to engage the tire beads and then retract longitudinally to clamp the beads together. One of a pair of power driven rolls having roughened, wear resistant surfaces, then is moved toward the fixed roll of a pair to grip the tire between them and rotate the tire and spindle assembly. The spindle and drive roll assembly, together with the rotating tire, then is moved by a common support carriage toward a rotary flywheel type cutter assembly which operates on the tire in the radial direction inward from the tread area to an area closely adjacent the metal beads, reducing the tire to small pieces. An air fan is integrated with the flywheel of the cutter assembly to minimize heating of the flywheel and cutter mechanism. A metal sensor on the infeed support prevents operation of the apparatus if the tire contains steel belts.

16 Claims, 48 Drawing Figures

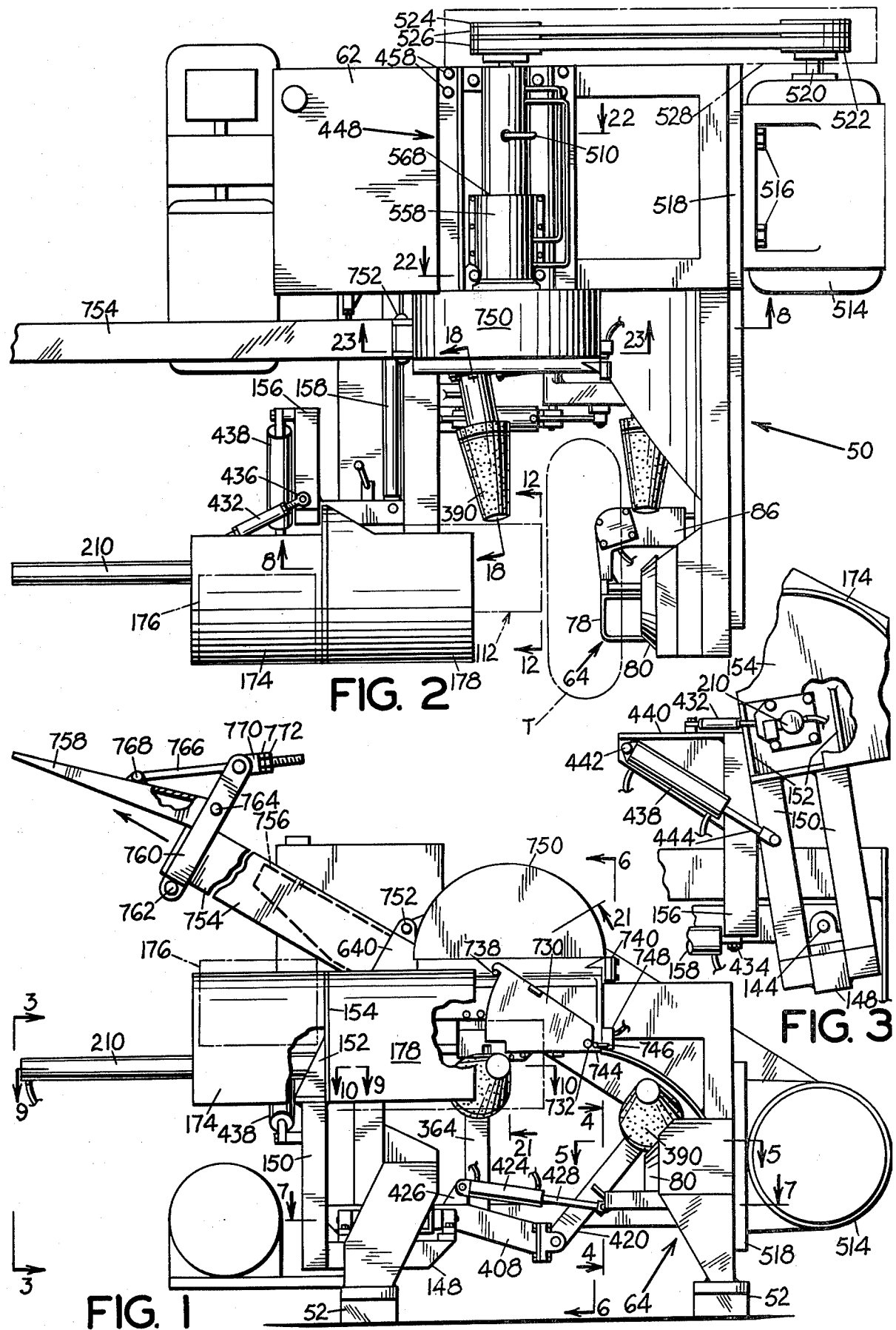

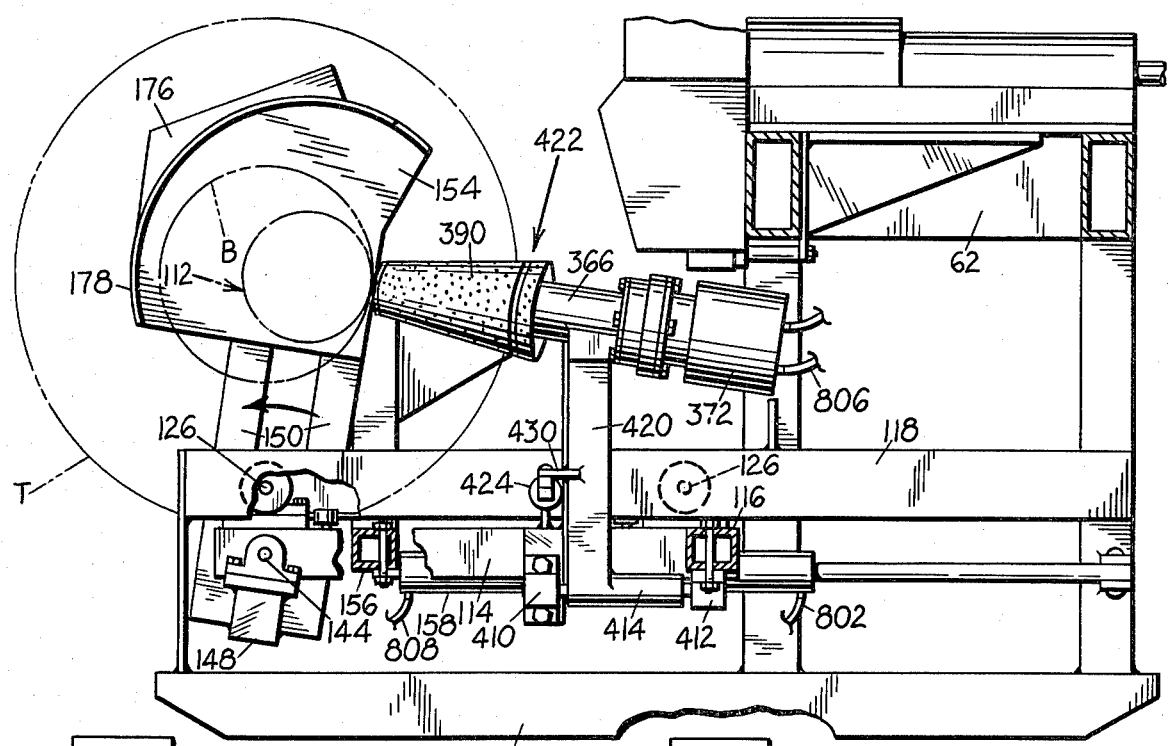
FIG. 6
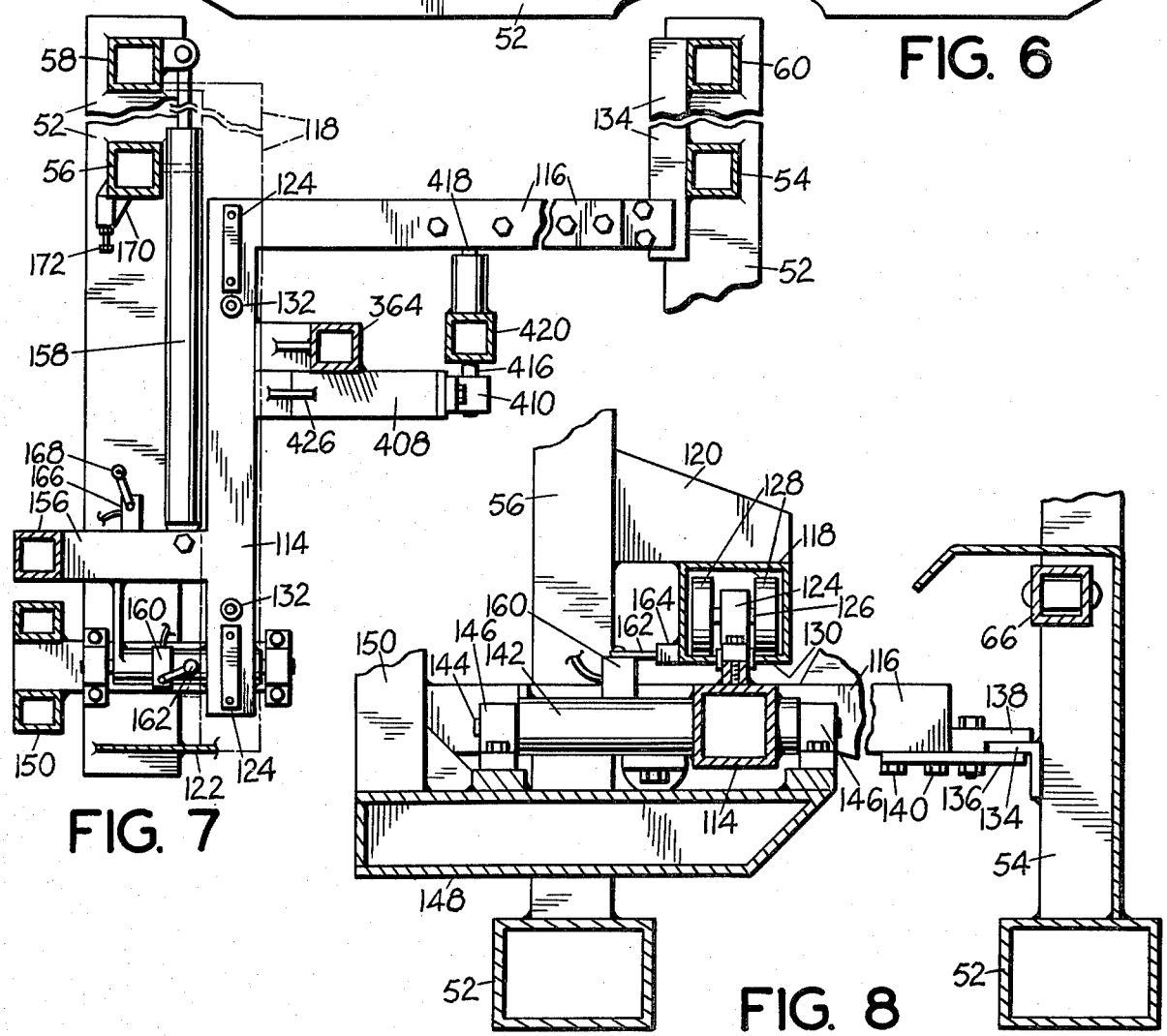
FIG. 7
FIG. 8

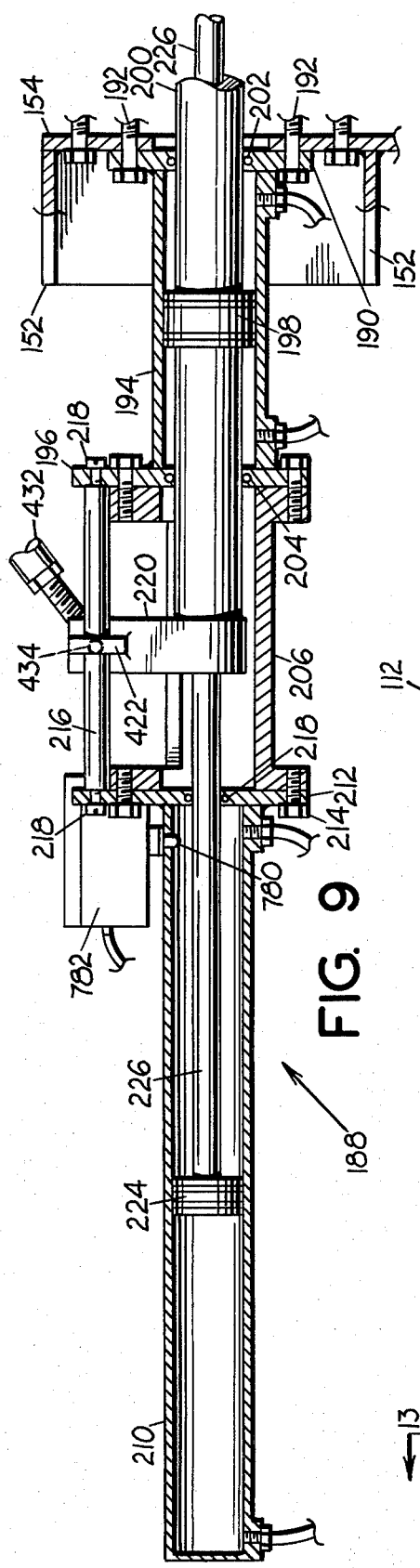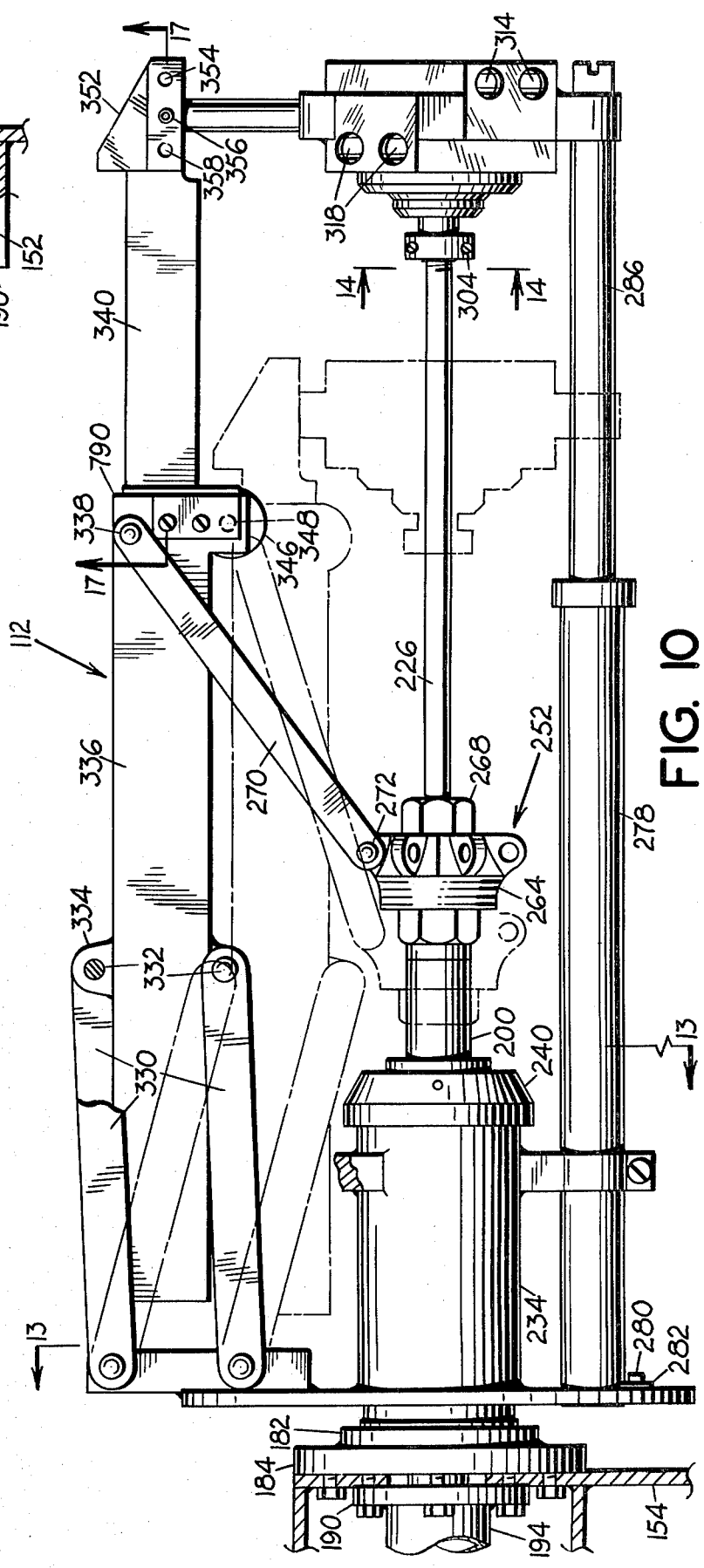

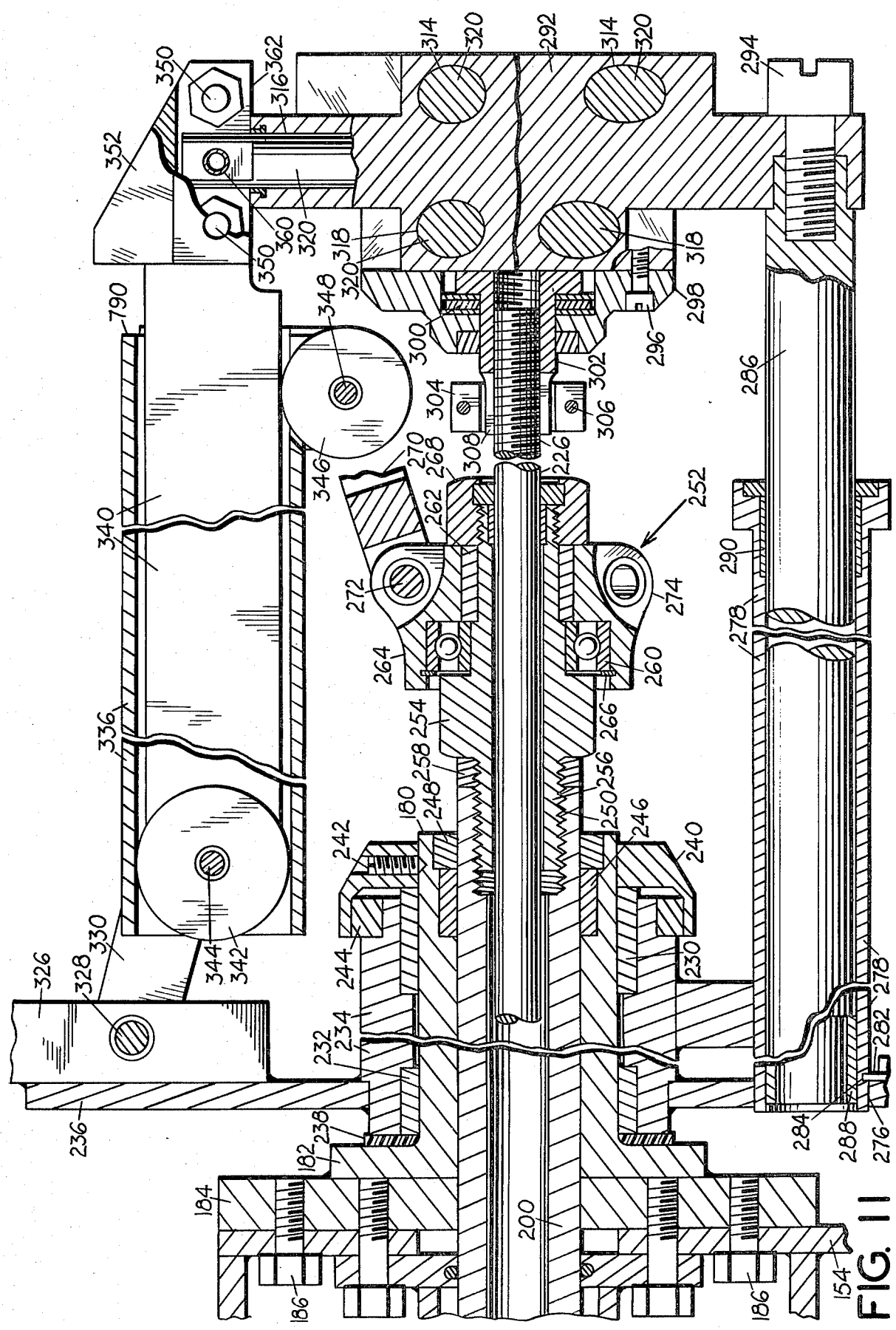

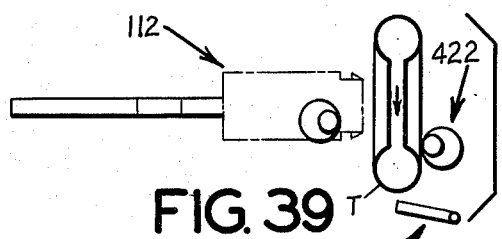
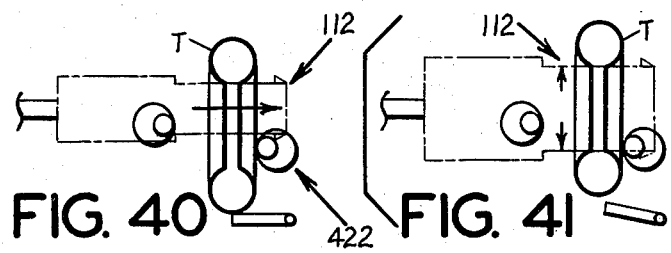
FIG. 39  FIG. 40  FIG. 41
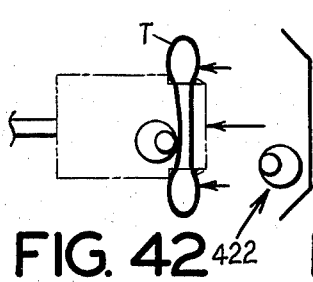
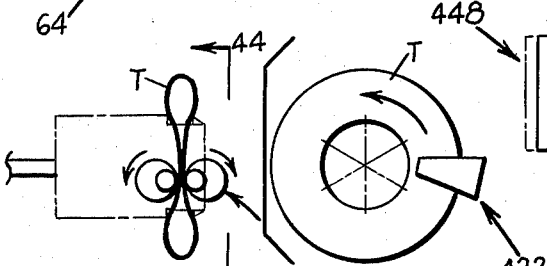
FIG. 42  FIG. 43  FIG. 44  FIG. 45
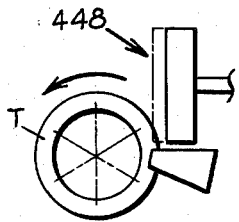
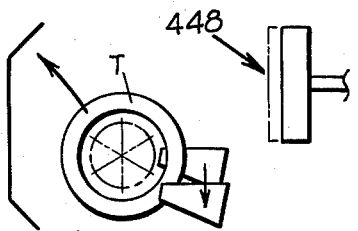
FIG. 46  FIG. 47
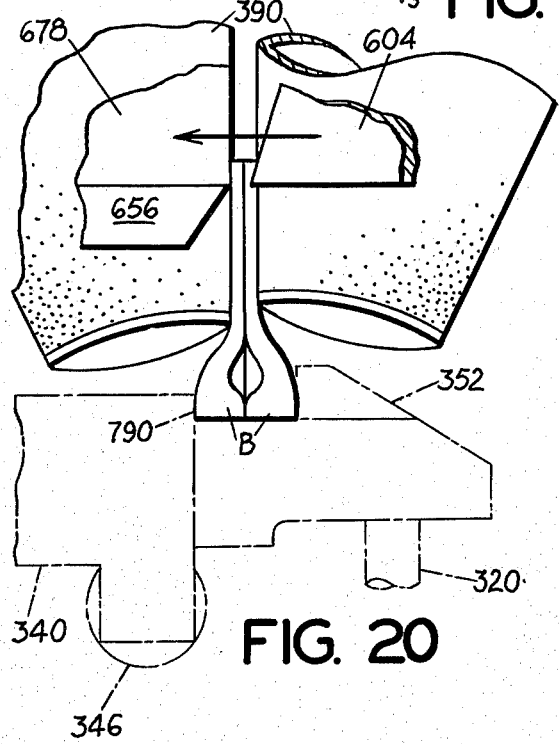
FIG. 20
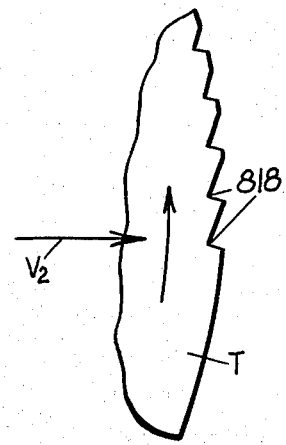
FIG. 48

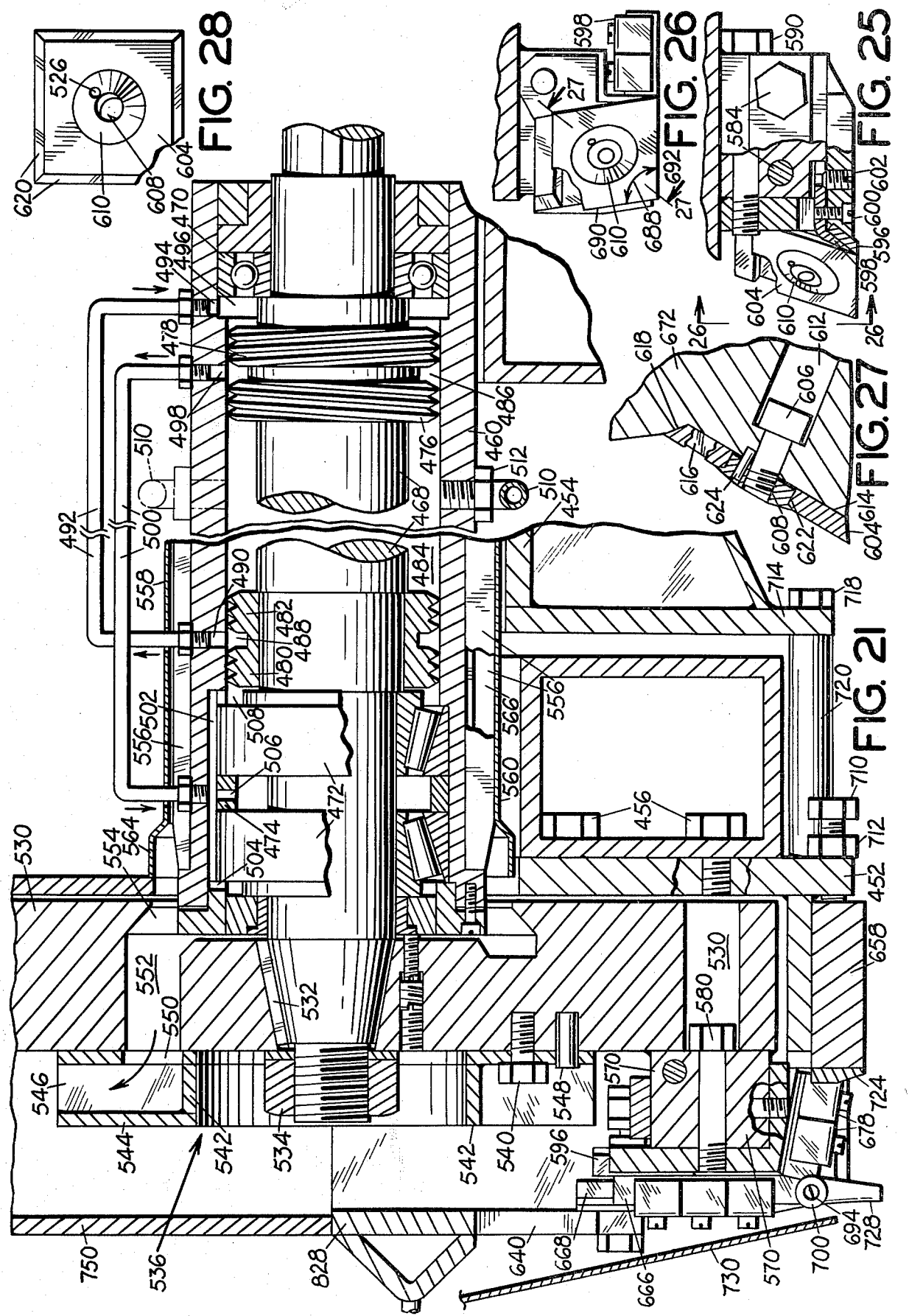

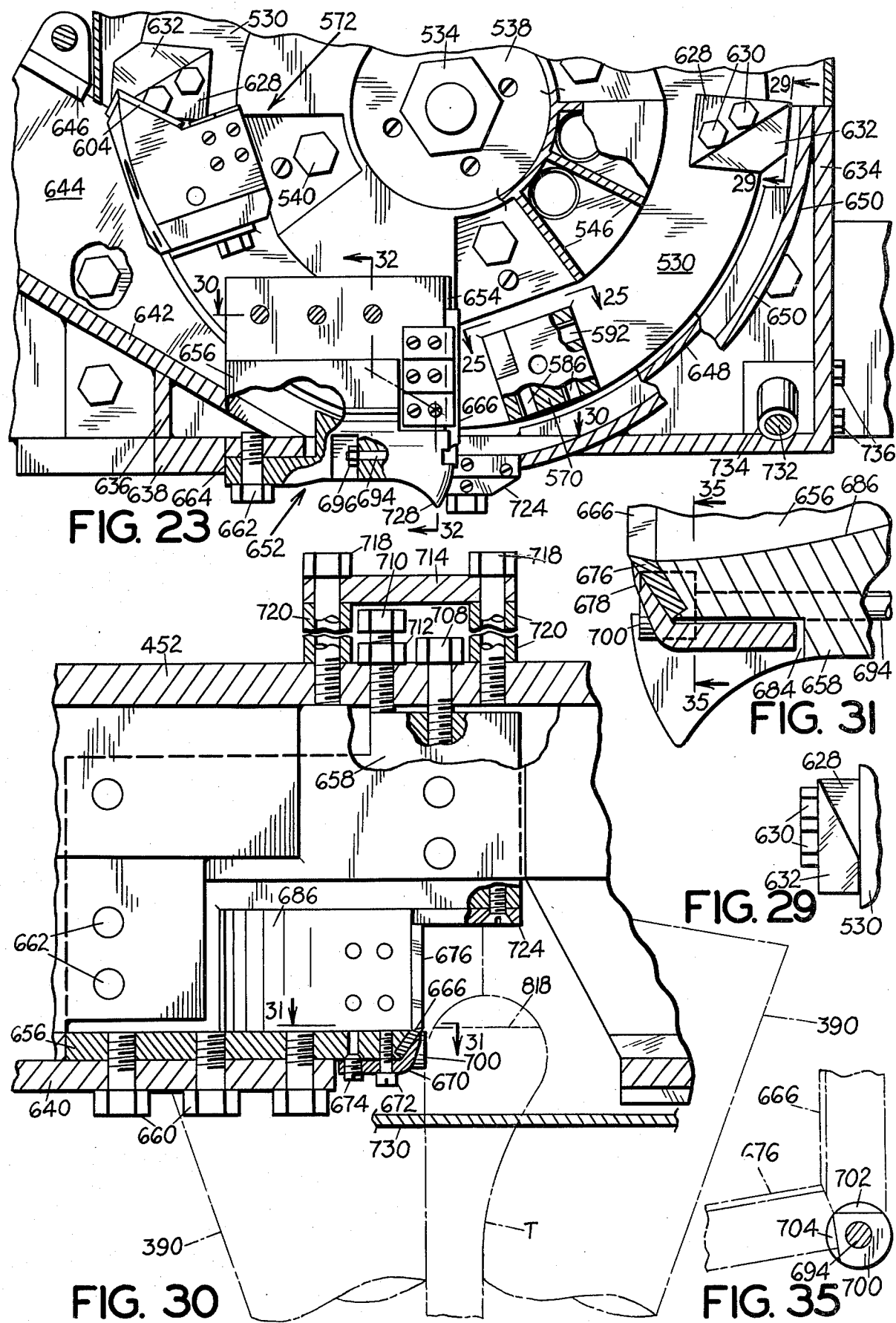

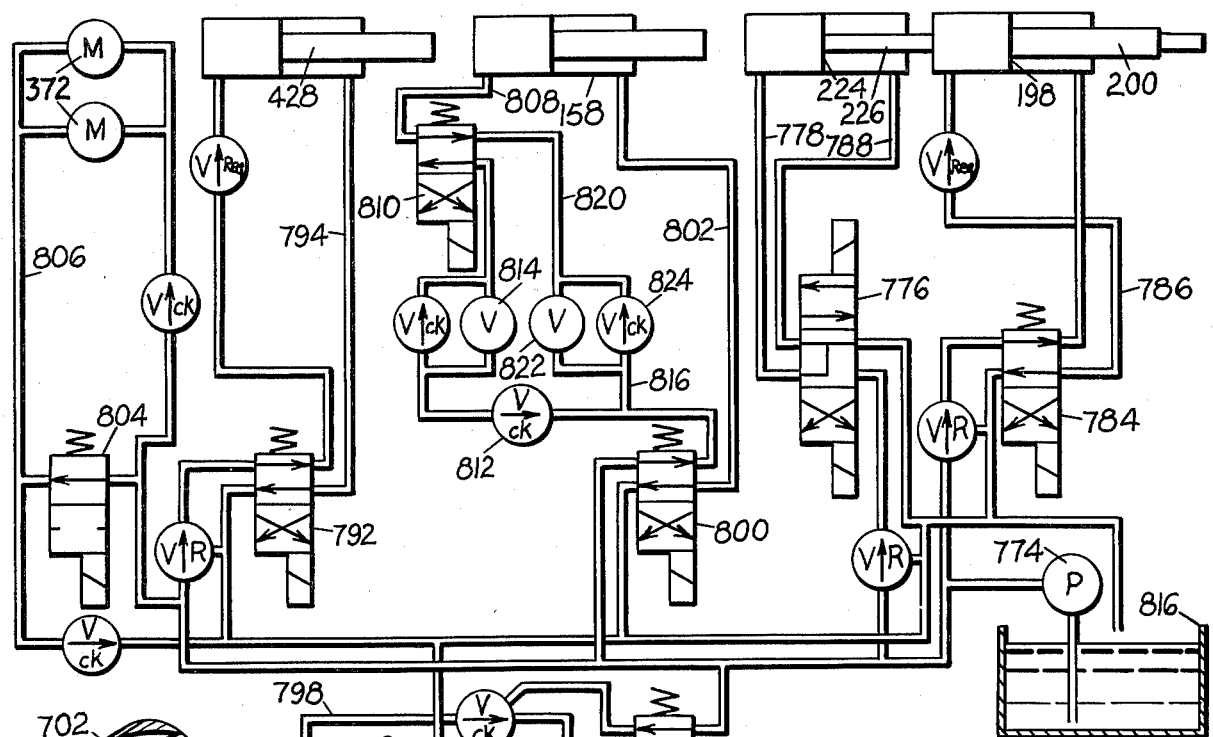
FIG. 38
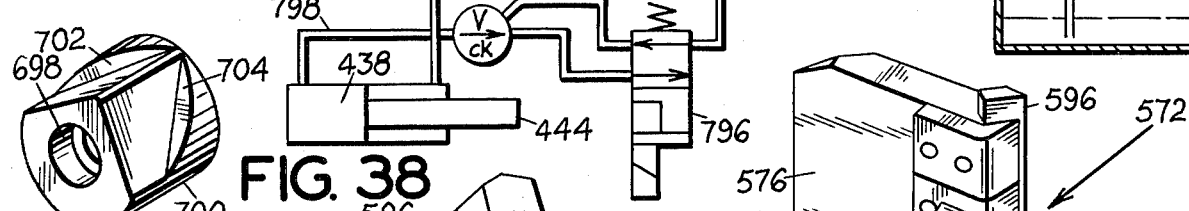
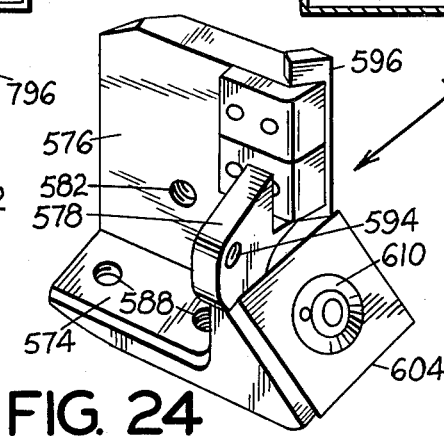
FIG. 24
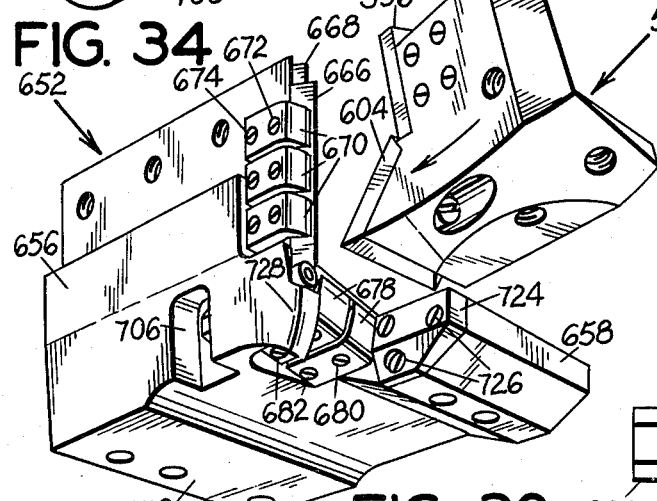
FIG. 34
FIG. 36
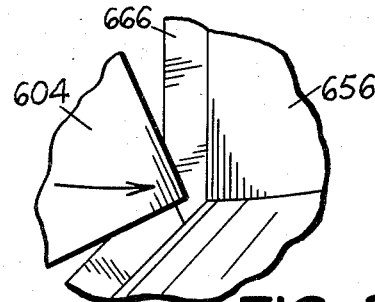
FIG. 37
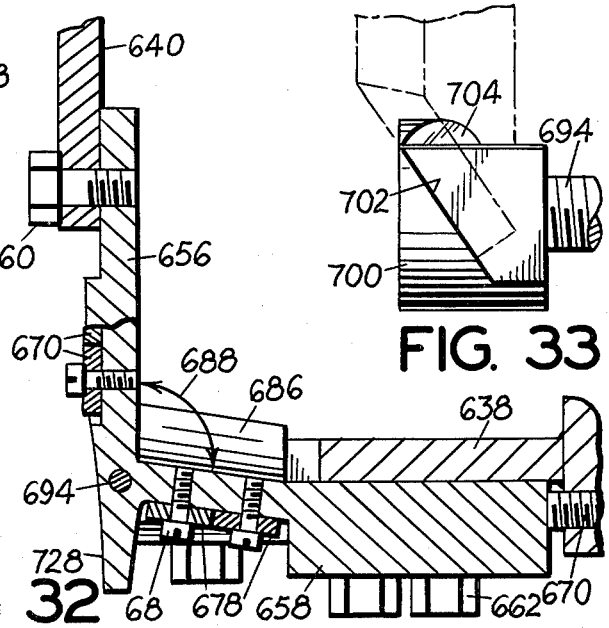
FIG. 33
FIG. 32

4,216,916

APPARATUS FOR SHREDDING TIRE CASINGS

BACKGROUND OF THE INVENTION

This invention relates to tire shredding apparatus, and more particularly to apparatus for reducing all but the bead areas of tire casings to small pieces.

My earlier patent, U.S. Pat. No. 3,843,074 discloses apparatus of this type, and this application discloses improved structural and operational features, including the following:

The operating components of the apparatus are activated sequentially to complete an operating cycle automatically and in a minimum of time.

A metal sensor is incorporated in the apparatus at the tire infeed station to prevent operation of the apparatuc if a steel belted tire is delivered to it.

The tire supporting spindle construction accommodates a wider range of tire sizes than my earlier apparatus.

The operating components of the apparatus are mounted on a single carriage and require less drive power than my earlier apparatus.

The cutter mechanism includes a cutter blade and anvil assembly which minimizes the power requirement for the tire shredding operation and also maximizes the operating life of the cutter blade.

The cutter mechanism includes a cutter blade capable of being adjusted to expose fresh cutting edges to replace worn ones, thereby increasing the operating life of cutter blades and minimizing apparatus down time required for blade replacement.

The cutter mechanism incorporates an air fan by which to minimize heating of the cutter assembly.

The foregoing and other objects and advantages of this invention will appear from the following detailed description, taken in connection with the accompanying drawings of a preferred embodiment.

BRIEF DESCRIPTION OF THE DRAWING

FIG. 1 is a foreshortened, front elevational view of tire shredding apparatus embodying the features of this invention, parts being broken away for convenience of illustration.

FIG. 2 is a fragmentary plan view of the apparatus illustrated in FIG. 1.

FIG. 3 is a fragmentary elevation as viewed on the line 3—3 in FIG. 1.

FIG. 6 is a fragmentary sectional view taken along the line 6—6 in FIG. 1, with parts broken away for convenience of illustration.

FIG. 7 is a foreshortened, fragmentary horizontal section taken on the line 7—7 in FIG. 1.

FIG. 8 is a foreshortened, fragmentary vertical section taken on the line 8—8 in FIG. 2.

FIG. 9 is a fragmentary sectional view taken on the line 9—9 in FIG. 1.

FIG. 10 is a fragmentary sectional view taken on the line 10—10 in FIG. 1, with some parts either broken away or removed for convenience of illustration.

FIG. 11 is an enlarged, foreshortened, fragmentary sectional view of FIG. 10.

FIG. 15 is a perspective view of the spindle head with all parts omitted.

FIG. 20 is a fragmentary, semi-diagrammatic plan view illustrating the relationship of the spindle, power rolls and cutter assemblies while shredding a tire.

FIG. 21 is a fragmentary, foreshortened vertical section taken on the line 21—21 in FIG. 1.

FIG. 23 is a fragmentary sectional view taken on the line 23—23 in FIG. 2.

FIG. 24 is a perspective view of a cutter head assembly embodying features of this invention.

FIG. 25 is a fragmentary sectional view taken on the line 25—25 in FIG. 23 showing the cutter head assembly installed.

FIG. 26 is a fragmentary sectional view taken on the line 26—26 in FIG. 25.

FIG. 27 is a fragmentary sectional view taken on the line 27—27 in FIG. 26.

FIG. 28 is a fragmentary rear elevation of a cutter blade and its associated nut.

FIG. 29 is an elevational view taken on the line 29—29 in FIG. 23.

FIG. 30 is a foreshortened, fragmentary sectional view taken on the line 30—30 in FIG. 23, with the flywheel omitted for convenience of illustration.

FIG. 31 is a fragmentary, sectional view taken on the line 31—31 in FIG. 30.

FIG. 32 is a fragmentary sectional view taken on the line 32—32 in FIG. 23, with the flywheel assembly omitted.

FIG. 33 is an enlarged, fragmentary side elevation showing the operational relationship between the anvil knife-holding nut and the knife, the latter being shown in broken lines.

FIG. 34 is a perspective view of the anvil knife-holding nut.

FIG. 35 is a diagrammatic, fragmentary sectional view taken on the line 35—35 in FIG. 31.

FIG. 36 is a perspective view showing the relationship of the cutter head assembly and anvil assembly with all of the associated supporting structure omitted.

FIG. 37 is a fragmentary perspective view of the cutter knife and anvil as viewed in the opposite direction of FIG. 36.

FIG. 38 is a schematic diagram of an hydraulic circuit for operating the components of the apparatus.

FIG. 39 is a diagrammatic front view of the apparatus in tire-receiving position with the spindle and movable power roll retracted.

FIG. 40 is a diagrammatic front view of the apparatus with the tire having contacted the starting switch which fully extends the spindle.

FIG. 41 is a diagrammatic front view of the apparatus showing the expansion of the spindle.

FIG. 42 is a diagrammatic front view of the apparatus showing the partial retraction of the spindle.

FIG. 43 is a diagrammatic front view of the apparatus showing the movable power roll moved into operating position.

FIG. 44 is a diagrammatic side elevation taken on the line 44—44 in FIG. 43 showing the tire-supporting carriage at the start of its high speed travel V1 toward the cutter assembly.

FIG. 45 is a diagrammatic side elevation similar to FIG. 44 showing the carriage at the end of the high speed and the start of the slow speed travel V1, moving the rotoating tire into the path of the rotating cutter blades.

FIG. 46 is a diagrammatic side elevation similar to FIG. 44 showing the carriage stopped at the end of its slow speed travel following shredding of the tire.

FIG. 47 is a diagrammatic side elevation similar to FIG. 44 showing simultaneously the carriage being returned at high speed V3 to its start position, the retraction of the movable power roll and the contraction of the spindle preliminary to removal of the pair of tire beads which remain following shredding of the tire.

FIG. 48 is a fragmentary elevation of the periphery of the tire at the beginning portion of the shredding action of the cutter.

DESCRIPTION OF THE PREFERRED EMBODIMENT

Figure 4:
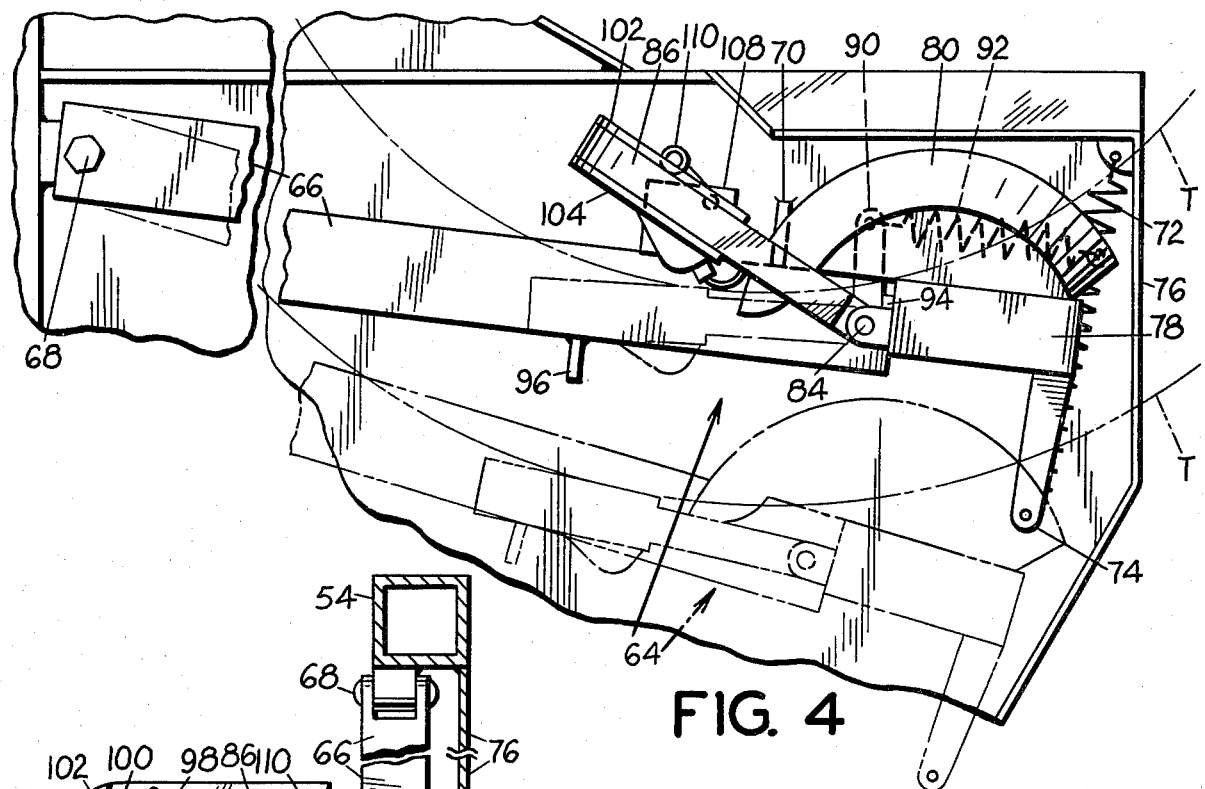
FIG. 4 is a foreshortened, fragmentary elevation as viewed in the line 4—4 in FIG. 1.

The components of the apparatus, indicated generally by reference numeral 50, are mounted upon a framework comprising a pair of skids 52 (FIGS. 1 and 6) supporting upright frame members 54, 56, 58 and 60 (FIG. 7) the top ends of which support a rectangular frame 62 (FIG. 6).

Figure 5:
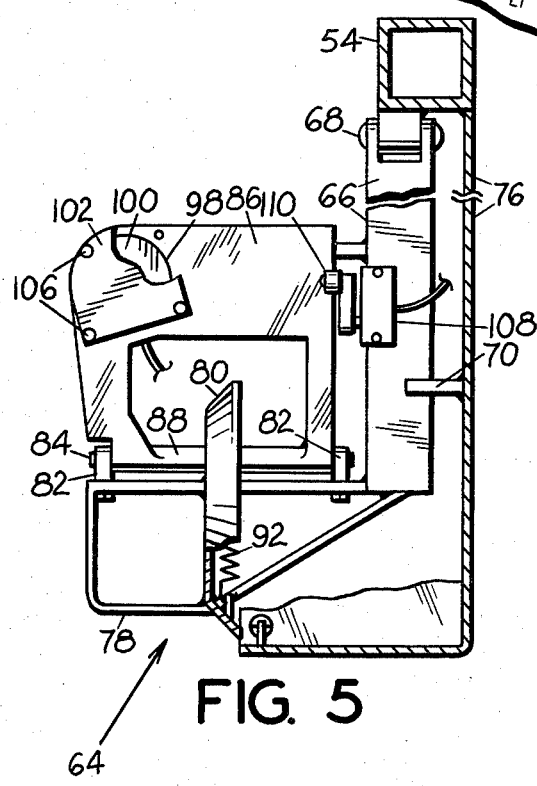
FIG. 5 is a foreshortened, horizontal section taken along the line 5—5 in FIG. 1, with parts broken away for convenience of illustration.

Located at the right front corner of the apparatus (FIGS. 1, 2, 4 and 5) is the combination metal detector and tire infeed support assembly 64 which is supported by an arm 66 (FIGS. 4 and 5). The arm is attached pivotally at its rear end to the upright frame 54 by pivot pin 68. The arm 66 is urged upward against the stop 70 by means of spring 72 the lower end of which is attached to an ear 74 on arm 66. The upper end of the spring is anchored to a tab on sub frame 76 which is integral with frame member 54.

Secured to the forward end of arm 66 and extending inwardly toward the center line of the apparatus is a tire supporting bracket 78 (FIGS. 2 and 5) and integral guide 80. Detachably and pivotally mounted to the rear face of bracket 78, by a pair of lugs 82 and shaft 84 (FIG. 5), is a deflection frame 86. The shaft 84 extends through a bearing tube 88 which forms a part of frame 86. Secured to the tube 88 intermediate its ends and extending upwardly therefrom is an ear 90 (FIG. 4). A tension spring 92 is extended between the ear 90 and the forward portion of guide 80. The upward travel of the frame 86 is limited by abutment of the ear 90 against a stop 94 on bracket 78. The downward travel of frame 86 is limited by a stop 96 on arm 66.

Positioned within a bore 98 in the inner rear portion of frame 86 is a metal detector unit 100. It is confined between two plates 102 and 104 secured detachably to the frame 86 by screws 106.

An electric switch 108 is mounted on the upper surface of arm 66 and positioned for its actuator element 110 to engage the upper surface of the frame 86.

A tire mounting spindle assembly 112 (FIGS. 2 and 10) is positioned adjacent the tire support assembly 64 for receiving a tire to be shredded. The assembly is mounted on a substantially L-shaped carriage frame having a longitudinal leg 114 and a transverse leg 116 (FIG. 7).

A primary carriage support track 118 is secured to the frames 56 and 58, at its rearward end by brackets 120 and at its front end by bracket 122.

Detachably secured to the top front and rear surface of leg 114 are a pair of bearings 124 each of which supports the shaft 126 (FIG. 8) both ends of which are pressed into pairs of rollers 128. The rollers are contained within and supported by the flanges 130 which form an integral part of track 118. Also mounted on the top of leg 114 closely adjacent each bearing 124 is a guide roller 132. These rollers are positioned between the flanges 130, with sufficient clearance to provide longitudinal guiding for the carriage.

A support track 134, having an L-shaped cross section, is attached to frames 54 and 60 and projects laterally inward therefrom for sliding reception between a pair of wear plates 136 and 138. These plates are secured, by bolts 140, detachably to the end of leg 116 opposite leg 114.

Fabricated within the forward end of leg 114 is a cross tube 142. A shaft 144 is pressed within the tube. Both ends of the shaft extend from the tube and are journaled within a pair of end bearings 146. The bearings are secured to the bottom, horizontal leg 148 of an L-shaped spindle supporting frame. The pair of vertical legs 150 of the frame are joined at their upper ends with brackets 152 which, in turn, are integral with a mounting plate 154 (FIGS. 1-3 and 6).

Extending outwardly and upwardly from leg 114 is an L-shaped frame member 156 located adjacent and parallel to frame 150. One end of an hydraulic cylinder 158 is secured to the frame 156 near its junction with leg 114, with the cylinder ram being attached to frame 58.

The "at rest" position of the carriage 114, 116 is controlled by an electric switch 160 which is secured to the top of tube 142. The actuator element 162 of the switch is arranged to engage a ramp 164 which is integral with and located near the front end of track 118. The forward limit of carriage travel is controlled by an electric switch 166 mounted on frame 156. The actuator element 168 of the switch is arranged to engage a ramp 170 located on the front face of frame 52. Also associated with frame 52 and ramp 170 is a malfunction safety stop 172.

Secured detachably to the outer face of plate 154 is a skirt 174 (FIG. 1) which also supports a control console 176 shown in broken lines. The inner face of plate 154 also mounts a shield 178.

Mounted detachably on the central inner portion of the plate 154 is a spindle support sleeve 180. A flange 182 on the outer end of the sleeve is fabricated to a flange 184 secured to the plate 154 by bolts 186 (FIG. 11).

Secured detachably to the outer face of the plate 154 and disposed coaxially with the spindle support sleeve 180 is a double acting hydraulic piston-cylinder assembly 188 (FIG. 9). A mounting flange 190 is secured to the outer face of plate 154 by bolts 192 which are threaded into mounting plate 184. An hydraulic spindle expanding-contracting cylinder 194 is integral with the mounting flange 190 at its inner end and is integral at its outer end with flange 196. A piston 198 is reciprocative within the cylinder 194, with a tubular piston rod 200 extending in opposite directions therefrom through sealed openings 202 and 204 formed within flanges 190 and 196, respectively.

A coupling member 206 is secured to the flange 196 by bolts 208. Mounted on the outer end of coupler 206 is an extending-retracting hydraulic cylinder 210. It is secured by means of flange 212 and bolts 214. The flanges 196 and 212 extend laterally to support a guide rod 216 between them, by means of a pair of screws 218. Integral with the outer end of rod 200 is an arm 220 which mounts a bearing 222 on its outer end. The bearing is journaled upon the rod 216.

Positioned within the cylinder 210 is a piston 224 having a piston rod 226 extending inwardly through a seal-mounted opening 228 formed within flange 212. The rod 226 extends completely through the tubular rod 200.

Mounted rotatably upon the spindle support sleeve 180 by means of bushings 230 and 232 (FIG. 11) is a spindle hub 234 provided by an integral flange 236. Positioned between the rear faces of hub 234 and bushing 232 and the front face of flange 182 is a thrust washer 238. The hub 234 is retained upon the spindle sleeve 180 by a hub lock ring 240, by means of set screws 242. A seal 244 is disposed between the lock ring 240 and the hub 234.

The rod 200 extends inwardly through the bore of spindle support sleeve 180, past bushing 246 and seal 248. Fixed to the internal threads 250 formed within the inner end of rod 200 is an expansion head assembly 252. This assembly includes a connector tube 254 having its outer end 256 threaded within the threads 250 and positioned longitudinally by means of spacer 258. The large diameter of the tube adjacent the threaded end 256 is provided with an hexagonal or other non-circular shape for application of a wrench.

A bearing 260 and a bushing 262 mount a bar pivot member 264 for relative rotation on the tube 254. The bearing 260 is retained within a bore in the pivot member by a C-clip 266 and the pivot member is retained on the tube 254 by retaining nut 268.

Figure 13:
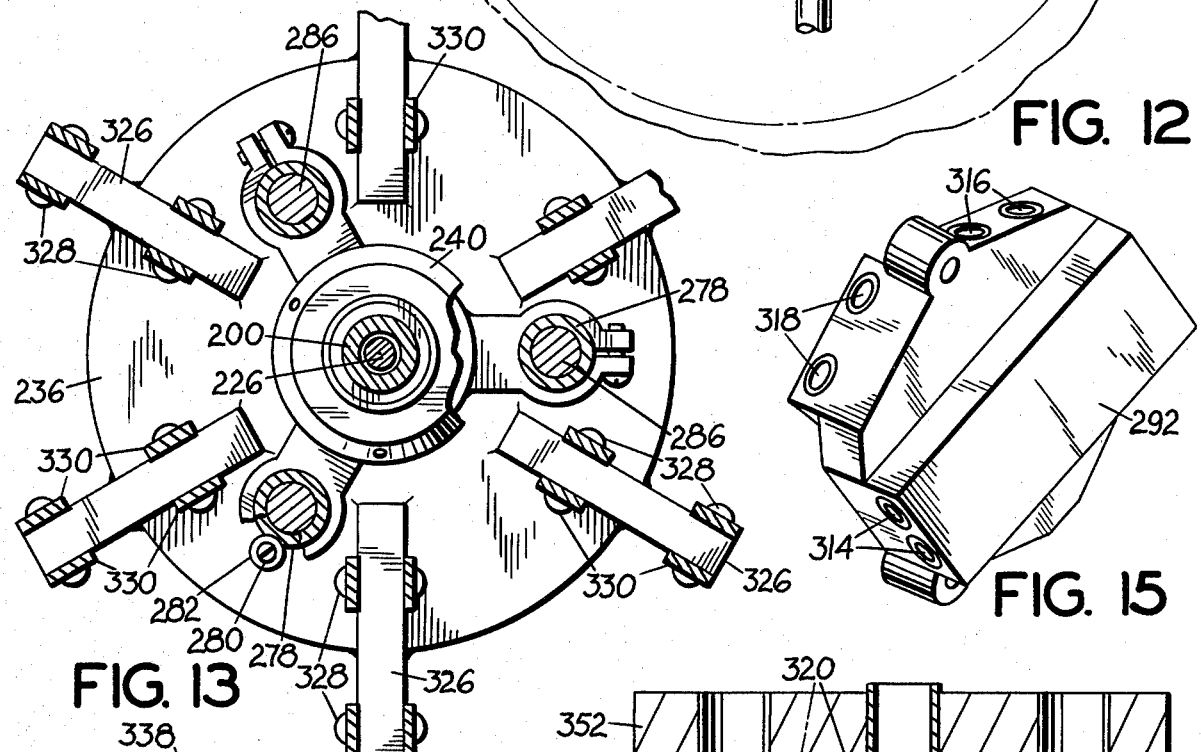
FIG. 13 is a fragmentary, transverse sectional view taken on the line 13—13 in FIG. 10, with parts broken away for convenience of illustration.

A spreader bar 270 is connected pivotally by means of a pivot pin 272 to each of the six equally spaced, radially disposed ears 274 which are integral with the bar pivot member 264. Located within three equally spaced bores 276 (FIGS. 11 and 13) formed within the flange 236 are guide tubes 278. The tubes are retained within said bores by means of bolts 280 and washers 282 which register with notches 284 formed within the surface of the tubes. Slidable within each guide tube 278 is a guide rod 286. Sliding motion is enhanced by bushing 288 on the rod and bushing 290 within the guide tube.

The end of the rods 286 projecting from the guide tubes are secured to and support an outer spindle head 292, by means of bolts 294. Thus, the head is maintained in centered relationship with respect to the spindle axis as the latter is extended through a tire and expanded to the tire bead.

Secured to the rear face of the head 292, by bolts 296, is a retainer 298 for bearing 300. A flanged bearing mount hub 302 extends through the bearing 300 and the bore in the rear end of retainer 298, for threaded connection to the forward, threaded end of the hydraulic piston rod 226. This rod is locked to the hub 302 by split clamp ring 304 and screws 306.

Figure 14:
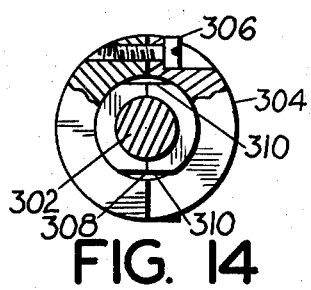
FIG. 14 is a transverse sectional view taken on the line 14—14 in FIG. 10, with parts broken away for convenience of illustration.
Figure 16:
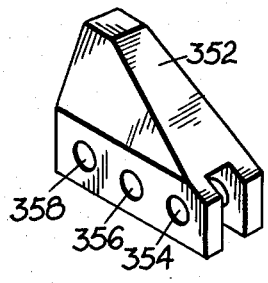
FIG. 16 is a perspective view of a spindle dog with all parts removed.
Figure 12:
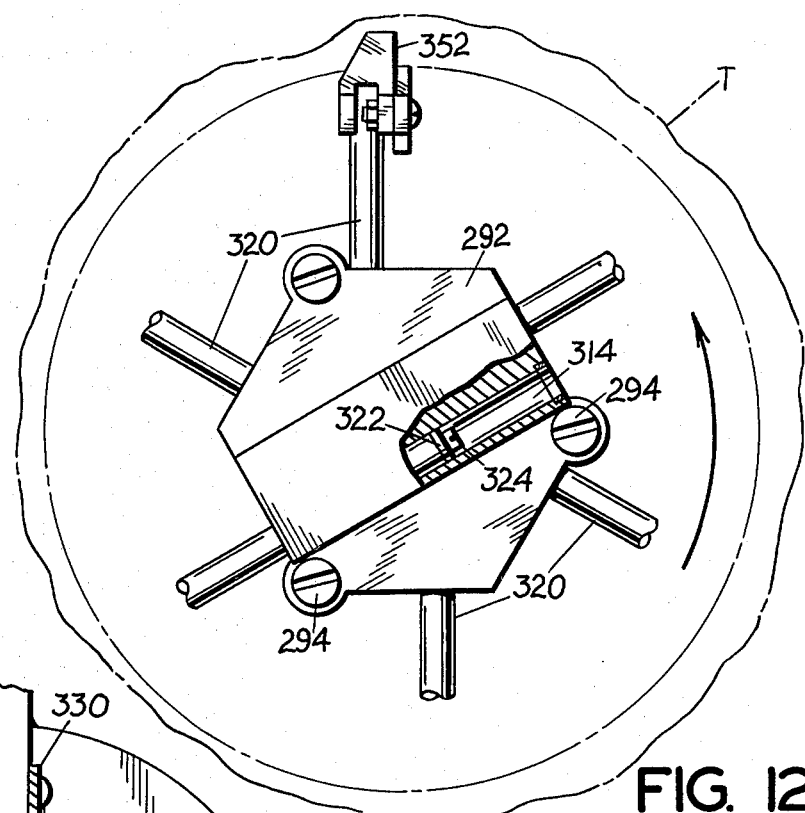
FIG. 12 is a vertical elevation as viewed on the line 12—12 in FIG. 2, with parts broken away for convenience of illustration.

Formed onto the end of hub 302 is a slot 308 (FIG. 14) and at right angles to this slot is formed a pair of oppositely disposed flat surfaces 310. These register with similar flat surfaces 312 formed within the clamping ring 304. The flat surfaces 310 accommodate a wrench.

Formed within head 292 are three pairs of bores 314, 316 and 318, as shown in FIGS. 10, 11, 12 and 15. The bores of each pair are disposed parallel to each other and are spaced symmetrically about the longitudinal axis of the head. The pairs of bores are spaced circumferentially 60° from an adjacent pair. Slidable within each bore is a cross rod 320 provided at its inner end with a seal 322 secured by a screw 324. The rods of each pair extend from the head in outwardly opposing directions.

Six anchor blocks 326 (FIGS. 10 and 11) are secured to the outer front face of the flange 236 in equally spaced circumferential positions. Mounted pivotally on each block, by means of pins 328, are a double pair of anchor bars 330. The inner ends of these bars are secured pivotally by pins 332 to ears 334 which are secured to an extension arm guide 336 rearwardly of the inner end of the latter. The distance between the pair of pins 328 is the same as the distance between the pair of pins 332, whereby to form a parallelogram linkage. The end of the spreader bar 270 opposite its connection to the bar pivot member 264 is secured pivotally by pins 338 to the inner end of the guide 336. The longitudinally spaced pivots 332 and 338 thus support the guide 336 with maximum stability.

Slidable within the guide 336 is an extension arm 340 the outer end of which rotatably mounts a pair of guide rolls 342 (FIG. 11) by means of pins 344. The inner end of arm 340 is guided by roller 346 mounted rotatably by pin 348 supported by inward extensions of guide 336 (FIG. 10). The arm 340 preferably is of rectangular cross section for greater strength and maximum cooperability with the rollers 346. The guide tube 336 is of matching rectangular cross section, as will be understood.

Figure 17:
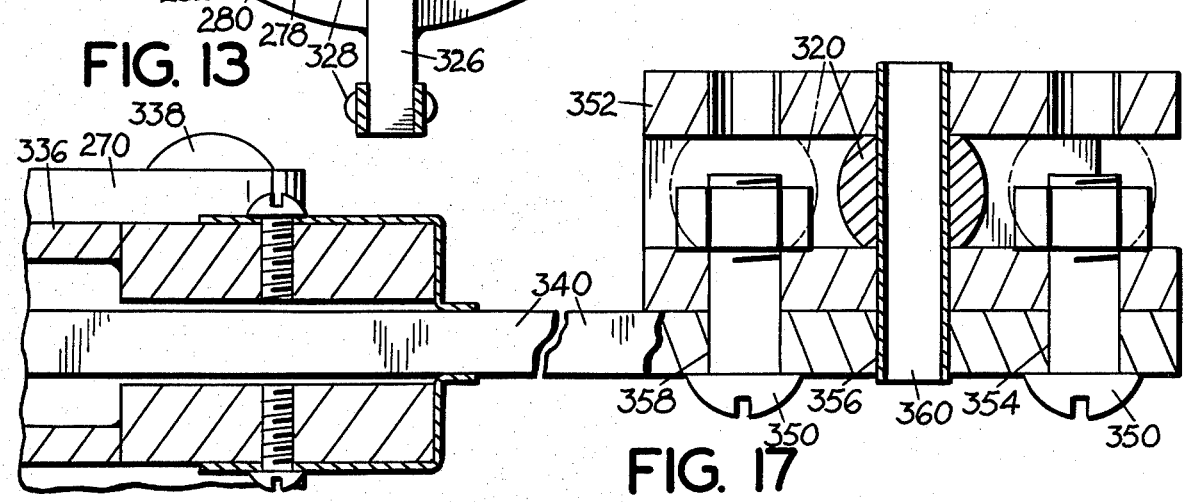
FIG. 17 is a fragmentary, foreshortened sectional view taken on the line 17—17 in FIG. 10.

Secured to the inner end of each arm 340 by means of bolts 350 is a tire bead engaging dog 352. As best shown in FIG. 10, the dog is provided with three transverse bores 354, 356 and 358 spaced apart to match the spacings of the bores 314, 316 and 318 in the head 292. Thus, each dog is secured to an associated rod 320 by use of the appropriate opening and roll pin 360, with the bolts 350 occupying the remaining pair of bores. For example, in FIGS. 10, 11 and 17, a rod 320 is secured to the middle hole 356 by means of roll pin 360 and the other two rods 320 in bores 314 and 318 will be attached to dogs 352 by using roll pins 360 and bores 354 and 358, respectively. Bolts 350 will be inserted in the remaining holes, as will be understood. This offset arrangement allows the use of long rods 320, and thus increases the range of tire sizes acceptable by the apparatus for shredding.

A recess 362 is formed in the end of each arm 340 adjacent the dog 352 for achieving maximum inward contraction of the assembly.

Figure 18:
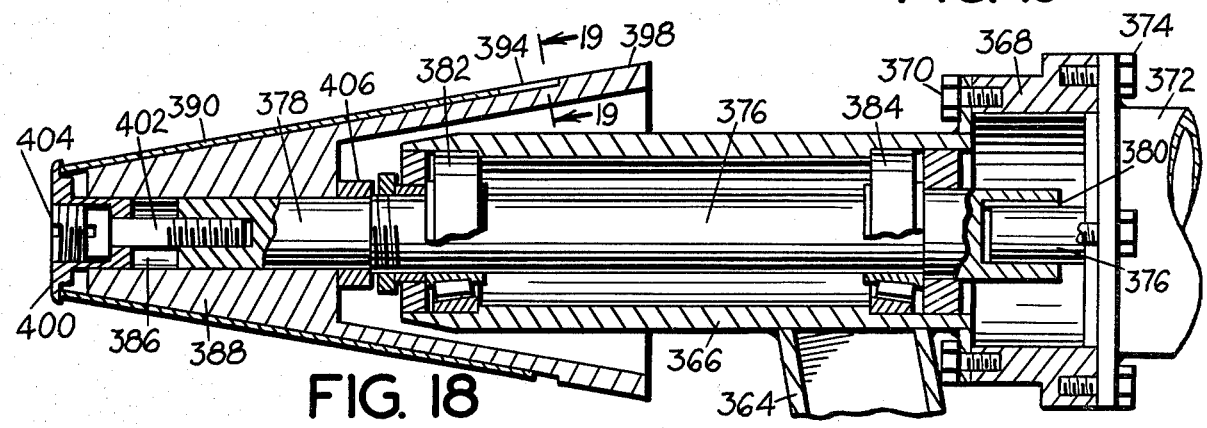
FIG. 18 is a fragmentary, longitudinal section taken on the line 18—18 in FIG. 2, with parts broken away for convenience of illustration.

Means is provided for rotating a tire to be shredded as it is supported on the spindle assembly. The vertical component 364 of an L-shaped support member extends from and is rigidly integral with the carriage leg 114 (FIGS. 1 and 7). The upper end of the support 364 joins integrally with a bearing carrier tube 366 (FIG. 18). A spacer tube 368 is secured to the end of tube 366 adjacent the support 364, by means of bolts 370. The opposite end of the spacer tube is secured to hydraulic motor 372, by bolts 374. The output shaft 376 of the motor is connected to a drive shaft 378 by means of a key 380. The shaft extends through bearings 382 and 384 mounted in the tube 366.

Figure 19:
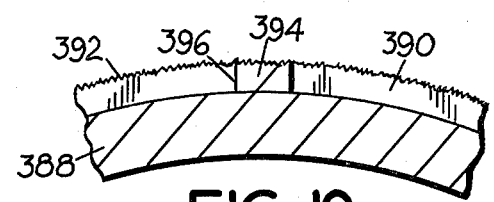
FIG. 19 is a fragmentary, sectional view taken on the line 19—19 in FIG. 18.

A longitudinal bore 386 formed within a frusto-conically shaped mandrel 388 is pressed upon the reduced diameter end portion of the shaft 378. A frusto-conically shaped sleeve 380 having a roughened and wear-resistant outer surface 392 (FIG. 19) is mounted on the outer surface of the mandrel. The sleeve surface conveniently is provided by a multiplicity of outwardly projecting spots of carbide welding material. The sleeve is locked rotationally by means of a key 394 on the mandrel registering with a slot 396 in the large diameter end of the sleeve. The frusto-conically shaped surface 398 on the large diameter end of the mandrel is made coincident with the latter surface of the sleeve 390.

A detachably mounted retaining cap 400 bears against the minor diameter end of the sleeve 390, by means of a bolt 402 entering a tapped hole formed within the end of shaft 378. A locking set screw 404 bears against the head of the bolt. The mandrel is located longitudinally on the shaft by means of a spacer 406 bearing against the mandrel and a shoulder formed on the shaft.

A pivoted power roll assembly is arranged for cooperative association with the fixed power roll assembly just described. Thus, an angled support arm 408 is attached integrally to the carriage arm 114 adjacent the support arm 364 (FIGS. 1 and 7). A bearing 410 is mounted detachably on the end of arm 408. A bearing 412 also is mounted detachably on the bottom surface of carriage leg 116. A tube 414 is journaled within the bearings by means of integral stub shafts 416 and 418, respectively. Formed integrally upon the front end of tube 414 is an upwardly extending support arm 420 which, at its upper end, mounts a power roll assembly 422. This assembly incorporates the same structural details as the fixed power roll assembly previously described.

The roll assembly 422 is pivoted by means of an hydraulic cylinder 424 (FIG. 1). One end of the cylinder is attached pivotally to an ear 426 projecting upwardly from the arm 408. The cylinder ram 428 is attached pivotally to bracket 430 on arm 420.

The angular relationship of the arms 364 and 420 with the tubes 366 is such that when in their operating position the uppermost surface of the sleeves 390 are tangent to a horizontal plane (FIG. 6). It should also be noted that, as shown in plan in FIG. 20, the angular relationship of the arms 364 and 420 to the tubes 366 is such that when in their operating position their confronting adjacent surfaces are parallel. It should be noted further that the pivoted power roll assembly 422 is positioned more rearwardly than the fixed roll assembly, for the purpose of maintaining proper clearance with the dogs 352.

Means is provided for maintaining a predetermined minimum spacing between the ends of the power rolls and the spindle assembly as the latter is varied in diameter to accommodate different sizes of tires. Since the power rolls are fixed relative to the carriage 114, 116 the spindle must be movable transversely to provide this spacing.

An expansion link 432 (FIG. 2) is mounted pivotally at one end on arm 220 (FIG. 9) by means of pivot pin 434. The opposite end of the link is secured pivotally to the top of frame 156 by pin 436. A hydraulic locking cylinder 438 is connected pivotally to an extended portion 440 of frame 156, by pin 442. The cylinder ram 444 is connected pivotally to the upper portion of the pivoted frame 150 by pin 446.

The link 432 may be of fixed length or of adjustable length. In either case, the length is chosen to provide the proper clearance between the ends of the power rolls 390 in any arbitrary diameter that is described by the spindle assembly 112. In the embodiment illustrated, the link is about twice the length of bar 270. As an example, if it is desired to increase the diameter of the spindle to accommodate a tire, the hydraulic rod 200 is driven to the right, in FIG. 10. This causes the outer ends of the spreader bars 270 to move outward, causing the guides 336 and arms 340 to expand radially. However, as the rod 200 moves to the right to expand the spindle diameter, the link 432 causes the frame 150, together with its associated spindle center line, or rotational axis, to be moved away from the power rolls. In this manner the clearance between the end of the power rolls and the changing diameter of the spindle 108 is constantly maintained.

Cutter mechanism 448 (FIG. 2) is provided for shredding a tire as it is rotated on the spindle by the power rolls.

Figure 22:
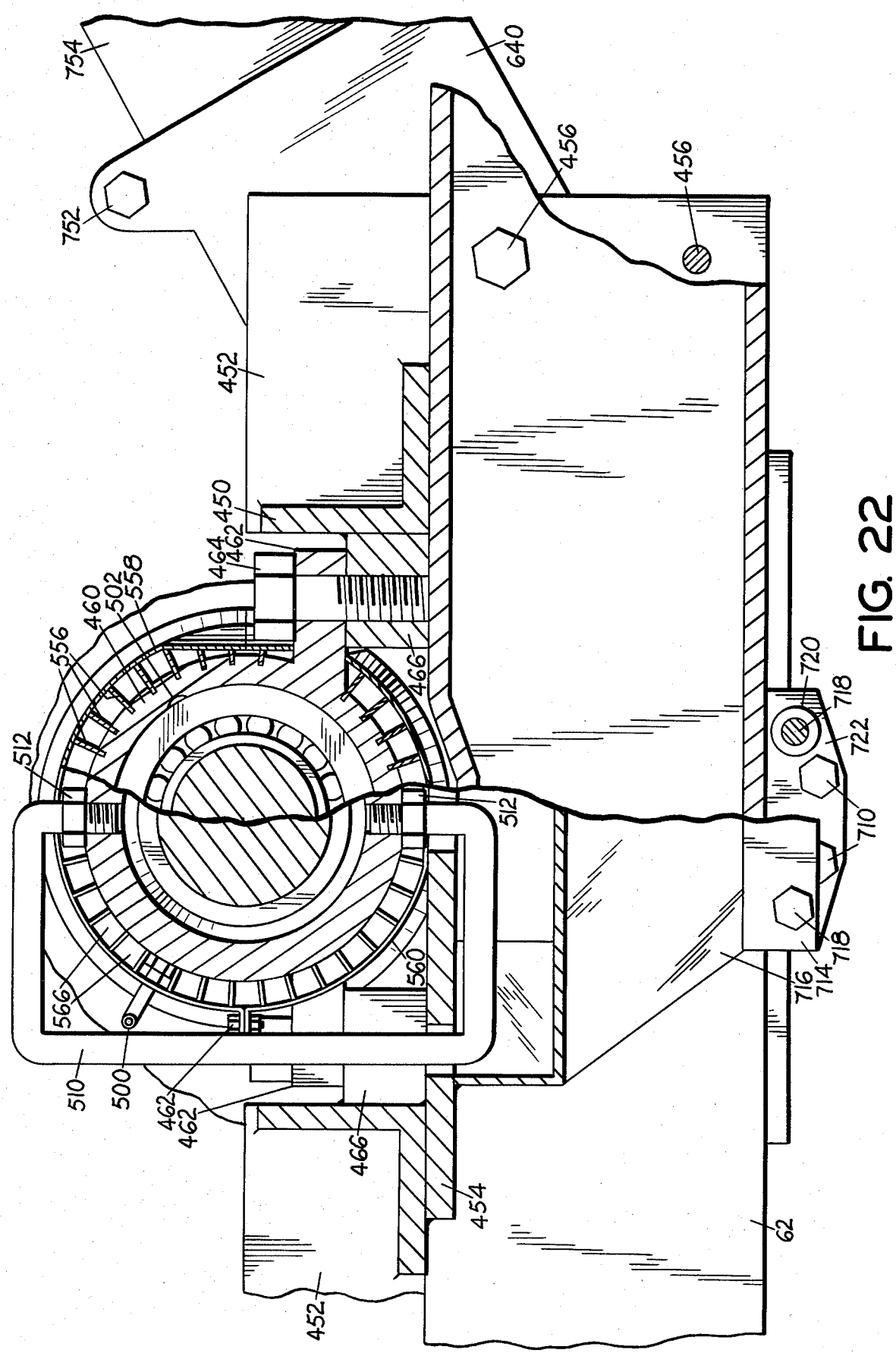
FIG. 22 is a fragmentary transverse sectional view taken on the line 22—22 in FIG. 2.

Secured to the top central portion of the rectangular frame 58 is a sub frame. This sub frame consists of a pair of longitudinal angle bars 450 (FIG. 22) which are integral at their forward ends with a vertically disposed transverse plate 452. The angle bars are bridged at their rear end by an integral horizontally disposed transverse plate 454. The front of the sub frame is attached to the frame 48 by means of bolts 456 and at their rear by bolts 458 (FIGS. 2 and 22). An arbor housing 460 is mounted detachably by means of integral ears 462 and bolts 464 secured within threaded bores in two pairs of inwardly disposed lugs 466 on the angle bars 450.

Extending through the length of the housing 460 is a shaft 468. It is supported by rear end bearing 470 and by a pair of front end bearings 472 separated by spacer 474. Secured to the shaft 468 inwardly of the end bearings are a pair of spiral pumps one comprising spiral threads 476 and 478 and the other comprising spiral threads 480 and 482. The direction of rotation of the shaft causes the spiral 476 to transfer lubricant from a reservoir 484 between the pumps to the central chamber 486 between the spirals. Similarly, the spiral 482 transfers lubricant from the reservoir to the central chamber 488. The lubricant then is forced through orifice 490, pipe 492, orifice 494 and then chamber 496 where it will lubricate the bearing 470. The lubricant then is transferred by spiral 478 from chamber 496 to the central chamber 486 and then is forced through orifice 498, pipe 500 and slot 502, from whence it lubricates both bearings 472 by means of slot 504, orifice 506 in spacer 474 and chamber 508. The lubricant then is transferred by means of spiral 482 back to the central chamber 488. Clearance between the inner spirals and the housing 460 allows excess lubricant to be returned from the chambers 486 and 488 back to the reservoir.

An oil level tube 510 is plumbed into the reservoir 484 by means of fittings 512, as shown in FIGS. 2, 21 and 22, to provide monitoring of the lubricant level in the reservoir.

The shaft 468 is driven by means of electric motor 514 which is secured by means of bolts 516 to a mounting plate 518 integral with frames 54 and 60 (FIGS. 1 and 2). The output shaft 520 of the motor is keyed to a pulley 522 which drives pulley 524 by means of belts 526. The pulley 524 is keyed to the reduced diameter rear end portion of the shaft 468. A protective housing is indicated by the broken lines 528.

The flywheel 530 is secured to the tapered front portion of the shaft 468 by means of a key 532 and a nut 534 secured to the threaded end of the shaft. A centrifugal fan 536 is secured to the front face of the flywheel by means of an integral flange 538 and bolts 540. It is formed by ring 542 projecting axially from flange 538 and by front plate 544 extending radially from ring 542. Radial walls 546 between the flange and front plate form centrifugal air discharge ducts. Accurate alignment of the fan to the flywheel is provided by dowels 548 which pass through holes in the flange and enter holes in the flywheel.

Holes 550 in flange 538 communicate with the air discharge ducts and also with bores 552 formed within the flywheel 530. The rear of these bores intercept an annular manifold 554 which is formed in the rear face of the flywheel. Mounted on the outer surface of the front portion of the housing 460 are a series of radially disposed cooling fins 556 (FIG. 22). Surrounding and contacting the outer surface of the fins is a shroud which consists of upper and lower segments 558 and 560, respectively, joined at their horizontal center line by means of bolts 562. The forward end 564 of the shroud is flared (FIG. 21) to provide efficient communication with the manifold 554. Plenum chambers 566 are formed by housing 460, fins 556 and shroud, the chambers being open to the atmosphere at the rear end 568 (FIG. 2) of the shroud. Spinning of the flywheel 530 and fan 536 thus produces a flow of air from the rear opening 568 through the plenum chambers 566, manifold 554 and holes 550 to the outlets of the air discharge ducts. This cooling air greatly aids in dissipating the heat generated in this forward portion of the arbor 448. Mounted at 90° intervals about the outer front face of the flywheel 530 are forwardly projecting cutter head mounting blocks 570 (FIGS. 21 and 23). Mounted detachably on each block is a cutter head 572 (FIG. 24). The cutter head consists of a bottom wall 574, front wall 576 and forward end wall 578. The front wall is secured to the mounting block by means of a bolt 580 (FIG. 21) which passes through a hole in the block and is threaded into a tapped hole 582 (FIGS. 21 and 24) in the front wall. Access to the bolt is obtained by an opening in the flywheel 530. The bottom wall 574 is secured detachably to the mounting block by bolts 584 (FIG. 25) which pass through holes 586 (FIG. 23) formed in the block and are threaded into tapped holes 588 (FIG. 24) formed in the bottom wall. The forward end wall 578 is mounted detachably on the block 570 by means of a bolt 590 (FIG. 25) which passes through a hole 592 (FIG. 23) formed in the block and then is threaded into a tapped hole 594 (FIG. 24) formed in the wall 578.

Mounted detachably on the forward and inner end of wall 576 is a knife bar 596 (FIG. 25). It is retained by a pair of L-shaped clamps 598 which are secured by means of screws 600. Additional clamping pressure is obtained by means of a set screw 602 which is threaded into a tapped hole in the wall 576. The end of the set screw bears against the inner end of the clamp, causing the opposite, off-set end of the clamp to bear firmly against the knife bar without allowing the clamp to bear against the wall 576.

An angled knife blade 604 is secured detachably to the forward portion of the end wall 578 by means of a bolt 606 (FIG. 27) which extends through a hole in the head 572 and is threaded into a tapped hole 608 formed in a nut 610. Access to the bolt is obtained by means of a bore 612 formed in the head. The knife is secured within a three-sided pocket formed upon the forward portion of wall 578, the pocket consisting of a backing face 614 and two angled walls 616 and 618. The knife has a parallelogram shape in plan view, preferably a square as illustrated (FIG. 28), with all edges 620 being similarly beveled.

A right angled hole 622 is formed centrally within the knife to receive the nut 610. The nut is keyed by means of a roll pin 624 secured to head 572 and extending through a hole 626 formed in the nut.

The axis of the bolt 606 and its associated hole in head 572 and nut 610 is positioned at an oblique angle relative to the pocket face 614. This causes two of the beveled edges 620 of the knife to bear firmly against the pocket faces 616 and 618. The relationship of the square plan form of the knife with the central hole 622 allows rotation of the knife to expose new, sharp edges as dulling occurs during normal operation of the apparatus.

A chip deflector 628 is mounted detachably on the front face of the flywheel 530, adjacent the knife 604, by means of bolts 630 (FIG. 23). An angled surface 632 is formed upon the forward, leading portion of the deflector and functions to cause the chips which were produced by the preceding cutter head 572 to be deflected away from the next succeeding cutter head.

The lower half of the flywheel assembly is enclosed by a housing which projects forwardly from plate 452. The housing consists of side walls 634 and 636, bottom wall 638 (FIG. 23) and front wall 640 (FIG. 21). A discharge chute is integral with the housing and consists of front wall 640, bottom wall 642, rear wall 644 and short top wall 646. Arcuate segments 648 and 650, secured to the housing and located at the lower right quadrant of the flywheel (FIG. 23), are coaxial with the flywheel. The inner surface of the segment 648 is located closely adjacent the periphery of the flywheel. The inner surface of the segment 650 is located closely adjacent the path described by the cutter head assembly.

An anvil assembly 652 (FIG. 36) is mounted detachably on the bottom wall 638 and front wall 640 and is positioned with its right edge 654 coincident with a vertical plane which intercepts the axis of the flywheel 530, as shown in FIG. 23. The anvil consists of a front wall 656 and a bottom wall 658. The front wall is secured to wall 640 by means of bolts 660. The bottom wall of the anvil is secured to wall 638 by means of bolts 662. A portion of the wall 638 which is adjacent the anvil wall 658 (FIG. 23) is extra thick, providing an abutment shoulder 664 for the anvil wall, and hence provides additional backing support for the anvil assembly. A vertically disposed knife bar 666 (FIGS. 30 and 36) is mounted detachably within an angled pocket 668 formed into the end 654 of the wall 656. The knife bar is retained by means of L-shaped clamps 670 which are secured detachably to the wall 656 by means of screws 672. A set screw 674 is employed to enhance the clamping action, as with set screw 602 described hereinbefore.

A second knife bar 676 is positioned within a pocket formed in the end portion of wall 658 and located adjacent knife bar 666 (FIG. 35). The knife bar 676 is retained by clamps 578, by means of screw 680 and set screw 682 (FIG. 36), as with screws 600 and 672 and set screws 602 and 674. The clamps 678 are positioned in pockets 684 (FIG. 31) in the bottom surface of wall 658.

A portion of the upper surface of anvil wall 658 adjacent wall 656 is formed into a ramp 686 which is angled obliquely in relation to wall 656. The angle 688 thus formed is coincident with the angle 688 (FIG. 26) formed between the operational planes generated by rotation, with flywheel 530, of the two edges 690 and 692 of the knife 604. This is achieved by tilting the blade 604 relative to the rotational axis of the flywheel. The axis of the ramp 686 is coincident with the axis of the flywheel 530.

Additional clamping force is provided at the apex of the knife bars 666 and 676 by means of bolt 694 (FIGS. 21 and 23). The threaded end of the bolt is secured to a nut 696, while the bolt head is secured in a hole 698 formed in clamping head 700 (FIGS. 31 and 34). Formed onto the outer surface of head 700 are angled clamping shoulders 702 and 704 which are arranged to engage the adjoining ends of the anvil knife bars 656 and 676. A recess 706 (FIG. 36) is formed within the corner portion of the anvil 652 to afford access to the nut 696.

As the cutting edges 690 and 692 of the knife 604 travel past the cutting edges of the anvil knife bars 676 and 666, respectively, they generate the angular operational plane which is coincident with the included angle 688 of the anvil edges and provide a slicing action, as illustrated in FIG. 37.

The rear portion (FIG. 30) of the wall 658 is secured adjustably to the wall 452 by means of a tension bolt 708. The bolt passes through a hole in the wall 452 and then is threaded into a tapped hole in wall 658. A compression bolt 710, in association with a lock nut 712, is threaded into a tapped hole in the wall 452 and bears against the end of wall 658 for adjusting and stabilizing the wall 658.

This area is further stabilized and strengthened by means of a downwardly extending plate 714 which is integral with plate 454 which, in turn, is braced by an integral angled bracket 716 (FIG. 22). The plate 714 is secured detachably to the plate 452 by means of a pair of bolts 718 which extend through sleeves 720 and then are threaded into tapped holes formed within a bottom projection 722 (FIG. 22) of plate 452.

A wear plate 724 (FIG. 36) is mounted detachably on the front face of the wall 658 by means of screws 726. A downwardly projecting angled tire guide 728 is located at the lower front corner of the anvil 652.

A tire trip door 730 (FIG. 1) is mounted pivotally at the right front portion of the flywheel housing by means of a pivot shaft 732. The shaft is journaled in bearing 734 secured to side plates 634 by bolts 736 (FIG. 23). A stop 738 limits the downward travel of the door, while stop 740 limits its upward travel. A finger 744 projects from the right side of the door for releasable contact with the actuator ellement 746 of an electric switch 748 (FIG. 1).

When the tire T initially contacts the door 730, the door pivots upward, causing the switch 748 to activate the low speed portion $V_2$ of travel of the carriage 114, 116 (FIG. 45).

The upper portion of the flywheel assembly is covered removably by housing 750 which is mounted pivotally by bolt 752.

A discharge tube 754 (FIG. 1) is aligned with the discharge end of the discharge chute by means of chute extension 756, and is secured to the chute by bolt 752. The discharge end of the tube is provided with an adjustable deflector 758 which is adjustable rotationally by means of clamping frame 760 and clamping bolts 762. The deflector is hinged to frame 760 by means of pivot pin 764. A threaded adjusting rod 766 is pivoted at its forward end to the deflector by means of pivot pin 768. The rearward, threaded end of the rod extends freely through a pivot member 770, and the projecting end mounts a pair of adjustable lock nuts 772 for abutment against the pivot member.

The operation of the apparatus described hereinbefore is as follows:

At rest, the carriage 114, 116 is positioned toward the front of the apparatus 50, as shown in FIGS. 6 and 7. The spindle assembly 112 is retracted longitudinally and contracted radially. The pivoted power roll 422 is in receiving position, as shown in FIGS. 1 and 2. The flywheel 530 rotates at full speed throughout the cycle, and the hydraulic pump 774 (FIG. 38) is activated also throughout the entire cycle.

The operator places a tire T on the bracket 78 and rolls it onto the frame 86 (FIG. 39). If the metal detector 100 senses steel belting in the tire, the detector will deactivate the system, unless the controls have been set otherwise for some particular purpose. The weight of the tire deflects the frame 86 downward, causing the switch 108 to position the four-way valve 776 (FIG. 38) to pressurize line 778. This causes the piston 224 to extend the rod 226 through the hollow rod 200 and extend the head 292 through the tire which is held in the position shown in FIGS. 2 and 40.

When the spindle is fully extended, the piston 224 actuates the plunger 780 of switch 782 (FIG. 9) to effect positioning of valve 784 to pressurize line 786. This causes piston 198 to move to extend rod 200 through the spindle support sleeve 180 and move the expansion head assembly 252 to the right (FIG. 10) and force arms 270 outward. This results in radial expansion of the associated guides 336 and arms 340 until the arms contact the bead B of the tire. Even though the bead restrains any further outward expansion of the arms, a continuous expansion pressure is maintained on the beads throughout this portion of the cycle (FIG. 41).

When a tire of relatively large bead diameter is placed upon the frame 86, the spindle will also extend through it, but when the spindle expands and engages the tire beads, the tire is forced downward, against the resilient resistance of the spring-loaded arm 66, to move the arm downward away from the stop 70. The downward movement occurs because of the initially high centerline of the large tire in relation to the spindle centerline, so that as the spindle expands the tire is forced downward until its axis of rotation coincides with the spindle axis.

The distance between the frame 86 and the spindle axis is arranged so that the majority of sizes of tires will not depress the arm 66 away from stop 70. The spring constant can be kept low while still providing a stable, non-bouncing support. The low spring constant is effective because it permits the required downward deflection with a minimum increase in spindle expanding energy.

A time delay switch, not shown, then will actuate the valve 776 to pressurize line 788 and cause the piston 224 to retract the spindle head 292 to the left until the dogs 352 engage the adjacent tire bead B (FIG. 20) and press it against the adjacent bead until the latter is brought against the shoulder 790 formed by the inner end of the guide 336. This position is illustrated in FIGS. 11, 20 and 42. The spindle head retracting pressure is maintained throughout this portion of the cycle.

The aforementioned time delay switch also is used to operate the power roll assembly 422 by actuating valve 792 to pressurize the line 794. This causes the ram 428 to be retracted within the cylinder 424, moving the power roll assembly 422 to squeeze the tire against the sleeve 390 of the fixed power roll assembly, as shown in FIG. 43. The squeezing forces continue throughout this portion of the cycle.

The time delay switch previously mentioned also starts the high speed portion $V_1$ of the carriage travel simultaneously with the above movement of the power roll assembly. The valve 800 thus is moved to pressurize line 802, causing the ram of cylinder 158 to retract. This causes the carriage 114, 116 to transport the tire toward the flywheel 530 and cutter head assembly, as shown in FIG. 44. When the carriage starts moving, the switch 160 positions valve 804 to pressurize line 806 which powers the hydraulic motors 372.

Switch 160 also functions to actuate valve 796 to block the line 798 and thus prevent the ram 444 from retracting in cylinder 438. This maintains constant clearance between the periphery of the spindle 112 and the power rolls throughout the operating cycle.

When the periphery of the tire contacts the door 730, the latter is moved upward until it activates the switch 748. This functions to stop the carriage travel and activate another time delay switch, not shown. After a time interval of approximately one revolution of the tire, the last mentioned time delay switch initiates the slow speed portion $V_2$ of the carriage travel. For this purpose the exhaust line 808 is connected through valve 810 with check valve 812 and regulator valve 814, and then through valve 800 to the pump reservoir 816. This slow speed portion is shown in FIG. 45 and it continues until the tire has been shredded to the condition shown in FIG. 46.

FIG. 48 is a fragmentary elevation of the periphery of the tire T at the beginning portion of the shredding action of the cutter. It illustrates the progressively formed notches 818 formed by cutting pieces from the tire during the slow moving portion $V_2$ of the carriage travel.

The carriage is stopped at the end of its slow speed travel by operation of switch 166 when its actuator element 168 engages the ramp 170 located on frame 56. This switch operates a time delay switch, not shown, to allow time for the beads B to be rotated for one revolution to allow the cutter head assembly to remove the remaining bead spiral.

At the beginning of the last mentioned time delay switch the valve 776 is moved to the position shown in FIG. 38, whereby equal pressure is applied on both sides of the piston 224 by means of lines 778 and 788. Relaxation of clamping pressure on the beads B allows even more material to be removed from the inner periphery of the beads.

At the end of the last mentioned time delay, a relay not shown causes the carriage to return to its starting position at high speed $V_3$ (FIG. 47) and deactivates and moves the roll 422 to its open position. The valve 800 is moved to connect the pump through line 820, regulator valve 822 and check valve 824, through valve 810 and line 808 to cylinder 158. The carriage travel stops at the end of its stroke. The relay last mentioned also simultaneously effects contraction of the spindle so that the remnants of beads B can be removed.

The complete cycle of operation, from the time a tire is placed upon the frame 86 to contraction of the spindle to remove the beads B following shredding, is about nine seconds.

The design of the cutter blades and their orientation with respect to the anvil minimizes the cutting friction and the consequent development of heat in the cutter and flywheel assembly. Operation of the centrifugal fan directs cooling air through and over the outer surface of the flywheel and cutter assembly to reduce the head build up. The cooling air passing through the plenum chambers between the shroud and housing 460 also operates to reduce the temperature of the lubricant circulated through the bearings 470 and 472. These factors contribute materially to minimization of power requirements and to maximization of operational efficiency.

It will be apparent to those skilled in the art that various changes may be made in the size, shape, type, number and arrangement of parts described hereinbefore, without departing from the spirit of this invention.

Having now described my invention, I claim:

1. Apparatus for shredding tire casings, comprising:
   (a) rotary tire support means for holding and rotating a tire about its axis, and
   (b) a cutter assembly adjacent the tire support means, the cutter assembly comprising:
      (1) an elongated hollow housing,
      (2) a shaft mounted for rotation in the housing and projecting longitudinally from one end thereof,
      (3) a flywheel secured to the projecting end of the shaft for rotation therewith,
      (4) a cutter blade mounted on the flywheel for rotation therewith,
      (5) a centrifugal fan mounted on the flywheel for rotation therewith and having an air inlet adjacent its center, and
      (6) an opening through the flywheel communicating at its forward end with the air inlet of the fan and at its rearward end with the atmosphere.

2. The apparatus of claim 1 wherein:
   (a) the cutter blade comprises a plate of parallelogram shape provided with four peripheral cutting edges, the included angle between an adjacent pair of said edges being the same as the included angle between the opposite adjacent pair of said edges, and
   (b) an anvil is mounted adjacent the flywheel and has a pair of adjacent edges arranged to provide an included angle coincident with the angle between the operational planes generated by an adjacent pair of edges of the cutter blade during rotation of the flywheel.

3. The apparatus of claim 1 including a shroud surrounding and spaced outwardly from the outer surface of the hollow housing, the rear end of the shroud being open to the atmosphere and the front end of the shroud communicating with the rearward end of the opening through the flywheel.

4. The apparatus of claim 3 including:
(a) a pair of longitudinally spaced bearings in the housing supporting the shaft for rotation,
(b) a pair of longitudinally spaced spiral pumps secured to the shaft for rotation therewith and located inwardly of the spaced bearings, forming a liquid lubricant reservoir between them, each pump comprising a pair of longitudinally spaced spiral threads arranged upon rotation of the shaft to move liquid lubricant from their outer sides to the space between them,
(c) conduit means communicating the space between the spiral threads of the front spiral pump with the rear bearing, and
(d) conduit means communicating the space between the spiral threads of the rear spiral pump with the front bearing.

5. The apparatus of claim 1 including:
(a) a pair of longitudinally spaced bearings in the housing supporting the shaft for rotation,
(b) a pair of longitudinally spaced spiral pumps secured to the shaft for rotation therewith and located inwardly of the spaced bearings, forming a liquid lubricant reservoir between them, each pump comprising a pair of longitudinally spaced spiral threads arranged upon rotation of the shaft to move liquid lubricant from their outer sides to the space between them, and
(c) conduit means communicating the space between each pair of spiral threads with said bearings for lubricating the latter.

6. Apparatus for shredding tire casings, comprising:
(a) rotary tire support means for holding and rotating a tire about its axis, and
(b) a cutter assembly adjacent the tire support means, the cutter assembly comprising:
(1) an elongated hollow housing,
(2) a shaft mounted for rotation in the housing and projecting longitudinally from one end thereof,
(3) a flywheel secured to the projecting end of the shaft for rotation therewith,
(4) a cutter blade mounted on the flywheel for rotation therewith,
(5) a centrifugal fan mounted on the flywheel for rotation therewith and having an air inlet adjacent its center,
(6) an opening through the flywheel communicating at its forward end with the air inlet of the fan,
(7) a shroud surrounding and spaced outwardly from the outer surface of the hollow housing, the rear end of the shroud being open to the atmosphere and the front end of the shroud communicating with the rearward end of the opening through the flywheel,
(8) a pair of longitudinally spaced bearings in the housing supporting the shaft for rotation,
(9) a pair of longitudinally spaced spiral pumps secured to the shaft for rotation therewith and located inwardly of the spaced bearings, forming a liquid lubricant reservoir between them, each pump comprising a pair of longitudinally spaced spiral threads arranged upon rotation of the shaft to move liquid lubricant from their outer sides to the space between them,
(10) conduit means communicating the space between the spiral threads of the front spiral pump with the rear bearing, and
(11) conduit means communicating the space between the spiral threads of the rear spiral pump with the front bearing.

7. In apparatus for shredding tire casings having an inner annular bead area, wherein the apparatus includes cutting means for shredding tire casings, tire infeed means arranged to position a tire for engagement by a longitudinally extensible and retractable and radially expandable and contractable spindle, and means mounting the tire infeed means for movement perpendicular to the spindle axis, for receiving on the spindle tire casings of diverse diameters.

8. In apparatus for shredding tire casings having an annular bead area, wherein the apparatus includes cutting means for shredding tire casings:
(a) tire supporting spindle means including a frame mounting a plurality of elongated arms for longitudinal extension and retraction on a longitudinal axis and radial expansion and contraction relative to said longitudinal axis,
(b) first power means on the frame engaging said spindle arms for extending and retracting them, and
(c) second power means on the frame engaging said spindle arms for expanding and contracting them, and
(d) the tire supporting spindle means including a bead engaging dog at the upper end of each arm, a central head connected to the first power means, the head having a plurality of bores therethrough spaced apart circumferentially and longitudinally with respect to the spindle axis, and an elongated rod extending slidably in each bore and connected at its outer end to an associated dog.

9. Apparatus for shredding tire casings having an inner annular bead area, the apparatus comprising, in combination with cutting means for shredding tire casings:
(a) tire infeed means movable under the weight of a tire,
(b) tire supporting spindle means including a frame mounting a plurality of elongated arms for longitudinal extension and retraction on a longitudinal axis and radial expansion and contraction relative to said longitudinal axis,
(c) first power means on the frame engaging said spindle arms for extending and retracting them,
(d) second power means on the frame engaging said spindle arms for expanding and contracting them,
(e) control means for said first power means arranged for engagement by the tire infeed means when moved by the weight of a tire to activate the first power means to extend the spindle arms longitudinally through the center opening of the tire, and
(f) control means for said second power means arranged for operative engagement by at least one of said longitudinally extended spindle arms to activate the second power means to expand said arms radially outward into contract with the bead area of the tire.

10. Apparatus for shredding tire casings having an inner annular bead area, the apparatus comprising, in combination with cutting means for shredding tire casings:

(a) tire supporting spindle means including a frame mounting a plurality of elongated arms for longitudinal extension and retraction on a longitudinal axis and radial expansion and contraction relative to said longitudinal axis, (b) first power means on the frame engaging said spindle arms for extending and retracting them, (c) second power means on the frame engaging said spindle arms for expanding and contracting them, (d) a carriage mounted for longitudinal movement, (e) a pair of tire rotating power rolls mounted on the carriage, and (f) mounting means on the carriage for mounting the spindle frame for movement of the longitudinal axis of the spindle means toward and away from the power rolls.

11. The apparatus of claim 10 including link means operatively interconnecting the carriage and the second power means for moving the spindle axis toward and away from the power rolls as the spindle arms are contracted and expanded.

12. The apparatus of claim 11 including spindle frame locking means operatively interengaging the carriage and spindle frame for securing the latter releasably against movement.

13. The apparatus of claim 11 wherein the first and second power means are longitudinally extensible and retractable fluid pressure piston-cylinder units, and the link means is an elongated link connected at one end to the piston of the second power means and at the opposite end to the carriage.

14. The apparatus of claim 10 wherein the spindle frame mounting means comprises a pivot the axis of which is arranged normal to the direction of movement of the carriage.

15. The apparatus of claim 14 including:

(a) link means operatively interconnecting the carriage and the second power means for pivoting the spindle frame and moving the spindle axis toward and away from the power rolls as the spindle arms are contracted and expanded, (b) the first and second power means are longitudinally extensible and retractable fluid pressure pistoncylinder units, and the link means is an elongated link connected at one end to the piston of the second power unit and at the opposite end to the carriage, and (c) spindle frame locking means operatively interengaging the carriage and spindle frame for securing the latter releasably against pivotal movement.

16. Apparatus for shredding tire casings having an inner annular bead area, the apparatus comprising:

(a) tire infeed means arranged to position the tire for engagement by spindle means, (b) tire supporting spindle means including a frame mounting a plurality of elongated arms for longitudinal extension and retraction on a longitudinal axis and radial expansion and contraction relative to said longitudinal axis, (c) first power means on the frame engaging said spindle arms for extending and retracting them, (d) second power means on the frame engaging said spindle arms for expanding and contracting them, (e) means mounting the tire infeed means for movement perpendicular to the spindle axis for receiving on the spindle tire casings of diverse diameters, (f) a carriage mounted for longitudinal movement, (g) a pair of tire rotating power rolls mounted on the carriage, (h) mounting means on the carriage for mounting the spindle frame for movement of the longitudinal axis of the spindle means toward and away from the power rolls, (i) link means operatively interconnecting the carriage and the second power means for moving the spindle axis toward and away from the power rolls as the spindle arms are contracted and expanded, (j) the first and second power means comprising longitudinally extensible and retractable fluid pressure piston-cylinder units and the link means comprising an elongated link connected at one end to the piston of the second power means and at the opposite end to the carriage, (k) spindle frame locking means operatively interengaging the carriage and spindle frame for securing the latter releasably against movement, (l) the tire supporting spindle means including a bead engaging dog at the outer end of each arm, a central head connected to the first power means, the head having a plurality of bores therethrough spaced apart circumferentially and longitudinally with respect to the spindle axis, and an elongated rod extending slidably in each bore and connected at its outer end to an associated dog, (m) a sleeve mounted removably on each power roll and having a roughened, wear-resistant, tire engaging surface, and (n) a cutter assembly including a rotary cutter blade support, a cutter blade mounted thereon, and a stationary anvil, the cutter blade comprising a plate of parallelogram shape provided with four peripheral cutting edges, the included angle between an adjacent pair of said edges being the same as the included angle of the opposite adjacent pair of said edges, and the anvil having a pair of adjacent edges arranged to provide an included angle coincident with the angle between the operational planes generated by an adjacent pair of edges of the cutter blade during rotation of the cutter blade support.

* * * * *